United States Patent
Viswanath et al.

(10) Patent No.: US 11,113,726 B1
(45) Date of Patent: Sep. 7, 2021

(54) METHODS, APPARATUSES, AND COMPUTER PROGRAM PRODUCTS FOR PROVIDING A PLATFORM FOR NEGOTIATION AND PROVISION OF PROMOTIONS

(71) Applicant: Groupon, Inc., Chicago, IL (US)

(72) Inventors: Sri Viswanath, Palo Alto, CA (US); Francisco Jose Larrain, Palo Alto, CA (US); Bhupesh Bansal, Sunnyvale, CA (US)

(73) Assignee: Groupon, Inc., Chicago, IL (US)

( * ) Notice: Subject to any disclaimer, the term of this patent is extended or adjusted under 35 U.S.C. 154(b) by 762 days.

(21) Appl. No.: 14/865,899

(22) Filed: Sep. 25, 2015

Related U.S. Application Data

(60) Provisional application No. 62/056,079, filed on Sep. 26, 2014.

(51) Int. Cl.
*G06Q 30/02* (2012.01)

(52) U.S. Cl.
CPC ..... *G06Q 30/0257* (2013.01); *G06Q 30/0269* (2013.01)

(58) Field of Classification Search
CPC ........................ G06Q 30/0257; G06Q 30/0269
(Continued)

(56) References Cited

U.S. PATENT DOCUMENTS 9,195,988 B2 * 11/2015 Fischer .............. G06Q 30/0204
2002/0052778 A1 * 5/2002 Murphy ................. G06Q 30/02
705/14.36

(Continued)

FOREIGN PATENT DOCUMENTS

WO    WO-2008134227 A1 * 11/2008 ............. G06Q 20/10

OTHER PUBLICATIONS

Benjamin Edelman, Mastering the Intermediaries, 2014 (Year: 2014).*

(Continued)

*Primary Examiner* — Tarek Elchanti
(74) *Attorney, Agent, or Firm* — Alston & Bird LLP

(57) ABSTRACT

Methods, apparatuses, and computer program products are provided herein to facilitate negotiation between consumers and merchants for promotions. In one embodiment, a method for generating promotion impressions is provided which includes receiving a consumer request for a promotion, wherein the consumer request comprises one or more indications of consumer preferences for the promotion and determining one or more potential merchants based in part on the consumer request. The method further comprises determining, for each potential merchant, if the potential merchant has pre-established promotion criteria that would meet the consumer request and if the potential merchant has pre-established promotion criteria that would meet the consumer request, storing promotion data for the potential merchant. The method further comprises, if the potential merchant does not have pre-established promotion criteria that would meet the consumer request, providing the consumer request to the potential merchant and, if a response is received from the potential merchant with promotion data, storing promotion data for the potential merchant. The method further comprises generating an impression comprising the promotion data for the one or more potential merchants. A corresponding apparatus and computer program product are also provided.

18 Claims, 10 Drawing Sheets

(58) Field of Classification Search
USPC .......... 705/14.54, 14.36, 14.13, 14.69, 14.1, 705/14.73, 14.39, 14.55; 455/414, 414.1, 455/456.3; 715/810
See application file for complete search history.

(56) References Cited

U.S. PATENT DOCUMENTS

| | | | | |
|---|---|---|---|---|
| 2002/0164977 | A1* | 11/2002 | Link, II | G06Q 30/02 455/414.1 |
| 2003/0212595 | A1* | 11/2003 | Antonucci | G06Q 30/02 705/14.27 |
| 2009/0271275 | A1* | 10/2009 | Regmi | G06Q 30/0238 705/14.73 |
| 2010/0250351 | A1* | 9/2010 | Gillenson | G06Q 30/02 705/14.13 |
| 2011/0112892 | A1* | 5/2011 | Tarantino | G06Q 30/02 705/14.1 |
| 2012/0190386 | A1* | 7/2012 | Anderson | G01S 19/14 455/456.3 |
| 2012/0240080 | A1* | 9/2012 | O'Malley | G06F 16/955 715/810 |
| 2013/0097006 | A1* | 4/2013 | Evans | G06Q 30/0601 705/14.39 |
| 2013/0332277 | A1* | 12/2013 | Faith | G06Q 30/0239 705/14.54 |
| 2014/0149230 | A1* | 5/2014 | Shepard | G06Q 30/0273 705/14.69 |

OTHER PUBLICATIONS

Richard Stim, Contract Negotiation: 11 Strategies, 2011 (Year: 2011).*

* cited by examiner

METHODS, APPARATUSES, AND COMPUTER PROGRAM PRODUCTS FOR PROVIDING A PLATFORM FOR NEGOTIATION AND PROVISION OF PROMOTIONS

CROSS-REFERENCE TO RELATED APPLICATIONS

The present application claims the benefit of U.S. Provisional Application No. 62/056,079, entitled "Methods, Apparatuses, and Computer Program Products for Providing a Platform for Negotiation and Provision of Promotions", filed on Sep. 26, 2014, the contents of which is incorporated by reference herein in its entirety.

FIELD

Embodiments of the invention relate, generally, to determining relevance signals for promotions to facilitate generating impressions for a consumer within a promotion and marketing service application.

BACKGROUND

Promotion and marketing services seek to encourage consumers to explore and discover available promotions that the consumer may be interested in, and as a result provide methods for using a variety of relevance measures to determine what available promotions should be presented to a consumer. In this regard, a number of deficiencies and problems associated with the methods and systems used to, among other things, identify promotions which may have a particular relevance to a consumer have been identified. Through applied effort, ingenuity, and innovation, many of these identified problems have been solved by developing solutions that are included in embodiments of the present invention, some examples of which are described herein.

BRIEF SUMMARY

Accordingly, a method, apparatus, and computer program product are provided to facilitate using consumer data in providing for the negotiation and provisioning of promotions for a consumer and to facilitate the generation of impressions comprising one or more promotions for a consumer from a promotion and marketing service.

In one embodiment, a method for generating promotion impressions is provided which includes receiving a consumer request for a promotion, wherein the consumer request comprises one or more indications of consumer preferences for the promotion; and determining one or more potential merchants based in part on the consumer request. The method further comprises determining, for each potential merchant, if the potential merchant has pre-established promotion criteria that would meet the consumer request; and if the potential merchant has pre-established promotion criteria that would meet the consumer request, storing promotion data for the potential merchant. The method further comprises, if the potential merchant does not have pre-established promotion criteria that would meet the consumer request, providing the consumer request to the potential merchant and, if a response is received from the potential merchant with promotion data, storing promotion data for the potential merchant. The method further comprises generating an impression comprising the promotion data for the one or more potential merchants.

In some embodiments, the method may further comprise providing the impression to a consumer in response to the consumer request; receiving a selection from the consumer of a promotion within the impression; and facilitating the acquisition of the selected promotion for the consumer.

In some embodiments, the method may further comprise wherein the determining one or more potential merchants is further based in part on consumer profile data.

In some embodiments, the method may further comprise wherein the pre-established promotion criteria are provided by the merchant and may be modified by the merchant.

In some embodiments, the method may further comprise determining parameters for a promotion meeting the consumer request based at least in part on the consumer request and a consumer profile.

In some embodiments, the method may further comprise providing the one or more potential merchants with consumer profile data along with the consumer request.

In some embodiments, the method may further comprise wherein the response received from the potential merchant comprises promotion data for a counter-offer, wherein the counter-offer comprises promotion data different from the consumer preferences for the promotion.

The method may further comprise providing the impression to a consumer in response to the consumer request; receiving a modified request comprising one or more modified indications of consumer preferences for the promotion; providing the modified request to the potential merchant; receiving a response from the potential merchant with promotion data; generating a new impression comprising the promotion data for the potential merchant; and providing the new impression to the consumer.

In some embodiments, the method may further comprise wherein the consumer request is for a last-minute promotion and one of the one or more indications of consumer preferences for the promotion comprises an indication of a premium.

In one embodiment, a method for generating promotion impressions is provided comprising receiving a consumer location data and determining one or more potential merchants based in part on the consumer location data. The method further comprising determining, for each potential merchant, if the potential merchant has a current promotion and, if the potential merchant has a current promotion, storing promotion data for the potential merchant's current promotion. The method further comprising generating an impression comprising the promotion data for the one or more potential merchants.

In some embodiments, the method may further comprise providing the impression to a consumer; receiving a selection from the consumer of a promotion within the impression; and facilitating the acquisition of the selected promotion for the consumer.

In some embodiments, the method may further comprise wherein the determining one or more potential merchants is further based in part on consumer profile data.

In some embodiments, the method may further comprise wherein the determining one or more potential merchants is further based in part on merchant established criteria.

In one embodiment, a method for acquiring a promotion for a consumer is provided comprising receiving consumer request for future promotion purchases, wherein the consumer request comprises one or more indications of a specific type of promotion to be purchased if available; determining if one or more promotions meet the indications in the consumer request; and facilitating the acquisition of the selected promotion for the consumer.

In one embodiment, an apparatus may be provided comprising at least one processor and at least one memory including computer program instructions, the at least one memory and the computer program instructions configured to, with the at least one processor, cause the apparatus to at least receive a consumer request for a promotion, wherein the consumer request comprises one or more indications of consumer preferences for the promotion; and determine one or more potential merchants based in part on the consumer request. The apparatus further comprising the at least one memory and the computer program instructions further configured to, with the at least one processor, cause the apparatus to determine, for each potential merchant, if the potential merchant has pre-established promotion criteria that would meet the consumer request; and if the potential merchant has pre-established promotion criteria that would meet the consumer request, store promotion data for the potential merchant. The apparatus further comprising the at least one memory and the computer program instructions further configured to, with the at least one processor, cause the apparatus to, if the potential merchant does not have pre-established promotion criteria that would meet the consumer request, provide the consumer request to the potential merchant; and if a response is received from the potential merchant with promotion data, store promotion data for the potential merchant. The apparatus further comprising the at least one memory and the computer program instructions further configured to, with the at least one processor, cause the apparatus to generate an impression comprising the promotion data for the one or more potential merchants.

In some embodiments, the apparatus may further comprise the at least one memory and the computer program instructions further configured to, with the at least one processor, cause the apparatus to provide the impression to a consumer in response to the consumer request; receive a selection from the consumer of a promotion within the impression; and facilitate the acquisition of the selected promotion for the consumer.

In some embodiments, the apparatus may further comprise wherein the determining one or more potential merchants is further based in part on consumer profile data.

In some embodiments, the apparatus may further comprise wherein the pre-established promotion criteria are provided by the merchant and may be modified by the merchant.

In some embodiments, the apparatus may further comprise the at least one memory and the computer program instructions configured to, with the at least one processor, cause the apparatus to determine parameters for a promotion meeting the consumer request based at least in part on the consumer request and a consumer profile.

In some embodiments, the apparatus may further comprise the at least one memory and the computer program instructions configured to, with the at least one processor, cause the apparatus to provide the one or more potential merchants with consumer profile data along with the consumer request.

In some embodiments, the apparatus may further comprise wherein the response received from the potential merchant comprises promotion data for a counter-offer, wherein the counter-offer comprises promotion data different from the consumer preferences for the promotion.

In some embodiments, the apparatus may further comprise the at least one memory and the computer program instructions configured to, with the at least one processor, cause the apparatus to provide the impression to a consumer in response to the consumer request; receive a modified request comprising one or more modified indications of consumer preferences for the promotion; provide the modified request to the potential merchant; receive a response from the potential merchant with promotion data; generate a new impression comprising the promotion data for the potential merchant; and provide the new impression to the consumer.

In some embodiments, the apparatus may further comprise wherein the consumer request is for a last-minute promotion and one of the one or more indications of consumer preferences for the promotion comprises an indication of a premium.

In one embodiment, an apparatus may be provided comprising at least one processor and at least one memory including computer program instructions, the at least one memory and the computer program instructions configured to, with the at least one processor, cause the apparatus to at least receive a consumer location data; and determine one or more potential merchants based in part on the consumer location data. The apparatus further comprising the at least one memory and the computer program instructions further configured to, with the at least one processor, cause the apparatus to determine, for each potential merchant, if the potential merchant has a current promotion; if the potential merchant has a current promotion, store promotion data for the potential merchant's current promotion; and generate an impression comprising the promotion data for the one or more potential merchants.

In some embodiments, the apparatus may further comprise the at least one memory and the computer program instructions configured to, with the at least one processor, cause the apparatus to provide the impression to a consumer; receive a selection from the consumer of a promotion within the impression; and facilitate the acquisition of the selected promotion for the consumer.

In some embodiments, the apparatus may further comprise wherein the determining one or more potential merchants is further based in part on consumer profile data. In some embodiments, the apparatus may further comprise wherein the determining one or more potential merchants is further based in part on merchant established criteria.

In one embodiment, an apparatus may be provided comprising at least one processor and at least one memory including computer program instructions, the at least one memory and the computer program instructions configured to, with the at least one processor, cause the apparatus to at least receive consumer request for future promotion purchases, wherein the consumer request comprises one or more indications of a specific type of promotion to be purchased if available; determine if one or more promotions meet the indications in the consumer request; and facilitate the acquisition of the selected promotion for the consumer.

In one embodiment, a method for generating promotion impressions is provided comprising receiving a consumer request for an event promotion, wherein the consumer request comprises one or more indications of consumer preferences for the event promotion and a parameter indicating a maximum premium for the event promotion. The method further comprises determining, via a processor, one or more potential merchants based in part on the consumer request. The method further comprises generating a promotion request for the one or more potential merchants based in part on the consumer request; and causing transmission of the promotion request to the one or more potential merchants. The method further comprises receiving event promotion data from one or more of the one or more potential merchants. The method further comprises determining, for each of the one or more potential merchants for which event promotion data was received, if the event promotion data meets the one or more indications of consumer preferences for the event promotion and does not exceed the maximum premium for the event promotion; and if the event promotion data meets the one or more indications of consumer preferences for the event promotion and does not exceed the maximum premium for the event promotion; generating an impression comprising the event promotion data for the one or more potential merchants.

In some embodiments, the method may further comprise providing the impression to a consumer in response to the consumer request; receiving a selection from the consumer of an event promotion within the impression; and facilitating the acquisition of the selected event promotion for the consumer.

In one embodiment, an apparatus may be provided comprising at least one processor and at least one memory including computer program instructions, the at least one memory and the computer program instructions configured to, with the at least one processor, cause the apparatus to at least receive a consumer request for an event promotion, wherein the consumer request comprises one or more indications of consumer preferences for the event promotion and a parameter indicating a maximum premium for the event promotion. The apparatus further comprising the at least one memory and the computer program instructions further configured to, with the at least one processor, cause the apparatus to determine one or more potential merchants based in part on the consumer request. The apparatus further comprising the at least one memory and the computer program instructions further configured to, with the at least one processor, cause the apparatus to generate a promotion request for the one or more potential merchants based in part on the consumer request and cause transmission of the promotion request to the one or more potential merchants. The apparatus further comprising the at least one memory and the computer program instructions further configured to, with the at least one processor, cause the apparatus to receive event promotion data from one or more of the one or more potential merchants. The apparatus further comprising the at least one memory and the computer program instructions further configured to, with the at least one processor, cause the apparatus to determine, for each of the one or more potential merchants for which event promotion data was received, if the event promotion data meets the one or more indications of consumer preferences for the event promotion and does not exceed the maximum premium for the event promotion; and if the event promotion data meets the one or more indications of consumer preferences for the event promotion and does not exceed the maximum premium for the event promotion; generate an impression comprising the event promotion data for the one or more potential merchants.

In some embodiments, the apparatus may further comprise the at least one memory and the computer program instructions further configured to, with the at least one processor, cause the apparatus to provide the impression to a consumer in response to the consumer request; receive a selection from the consumer of an event promotion within the impression; and facilitate the acquisition of the selected event promotion for the consumer.

BRIEF DESCRIPTION OF THE SEVERAL VIEWS OF THE DRAWINGS

Figure 1:
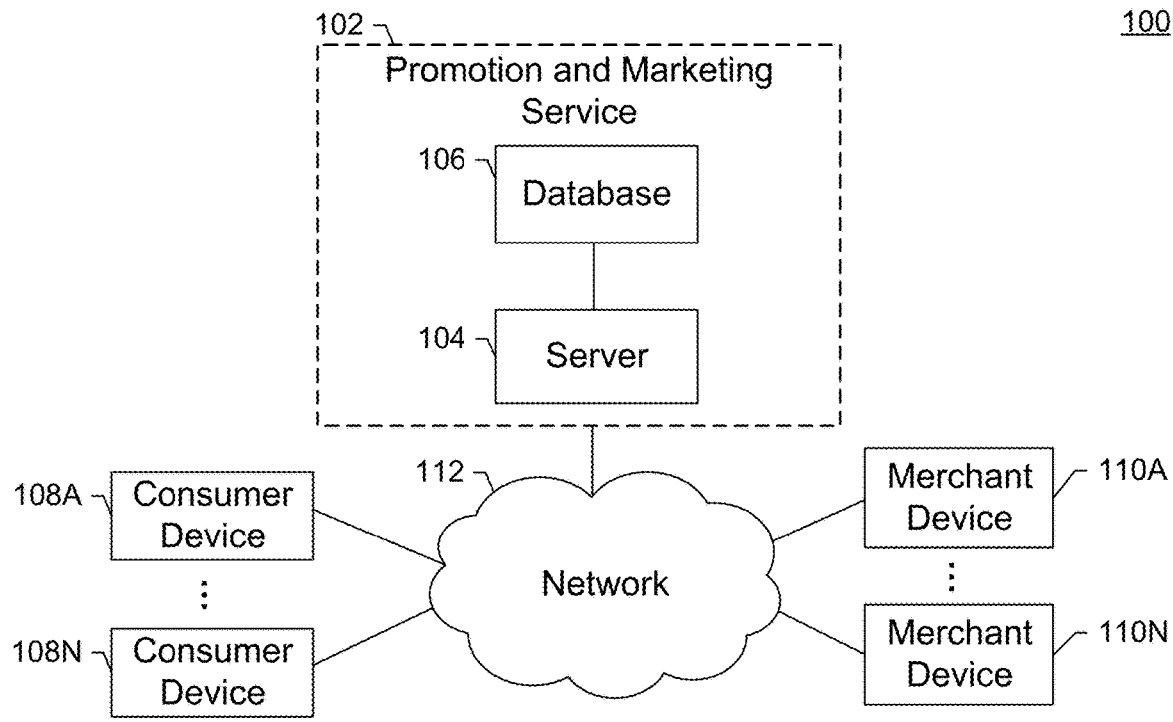
Figure 2A:
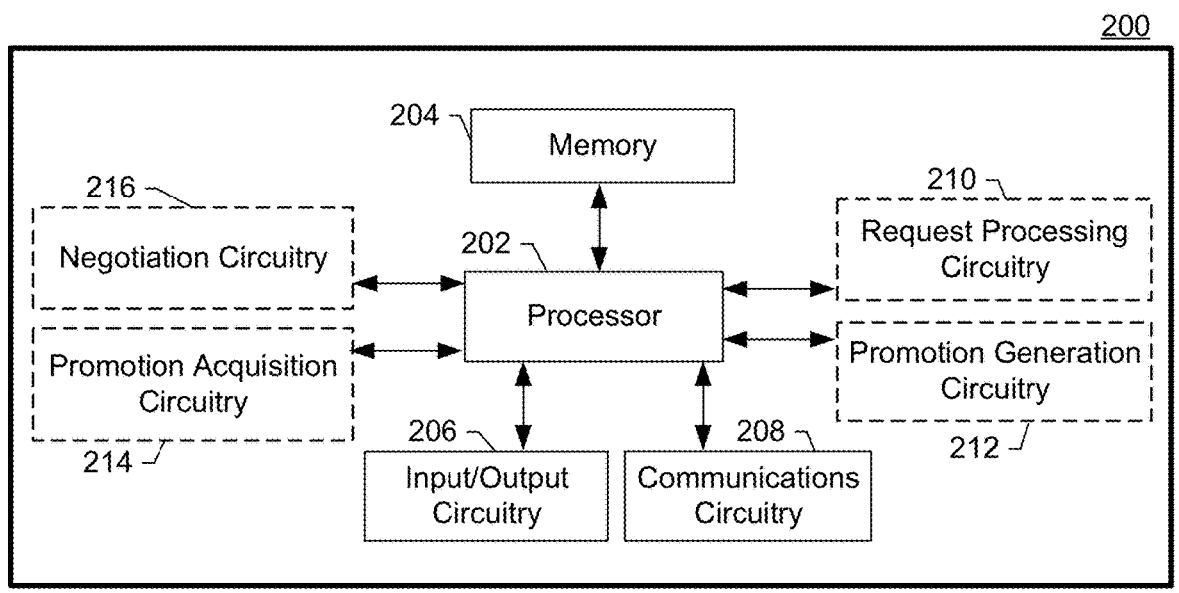
Figure 2B:
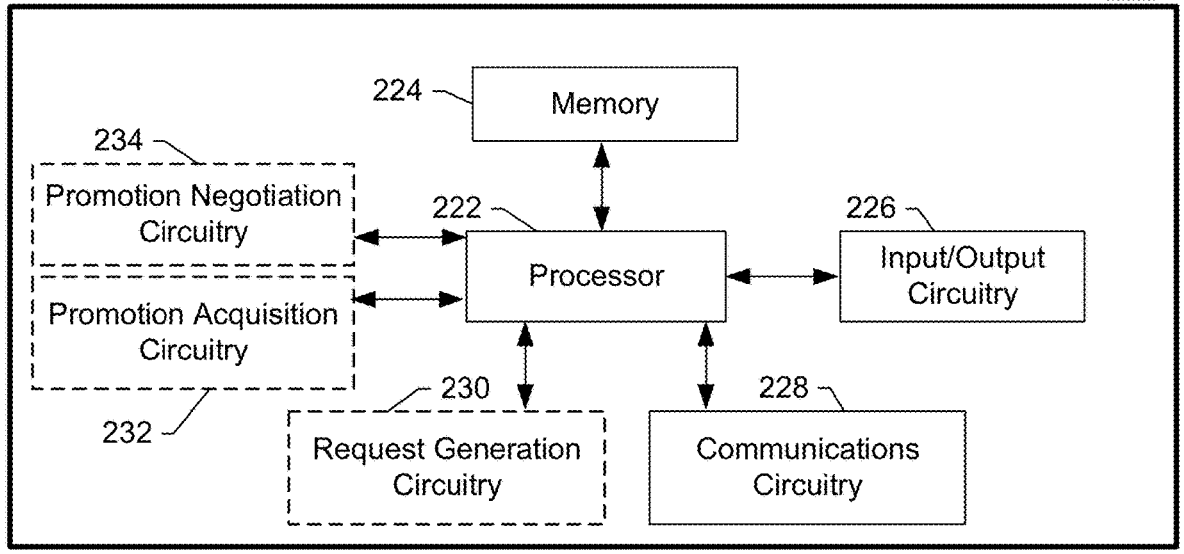
Figure 2C:
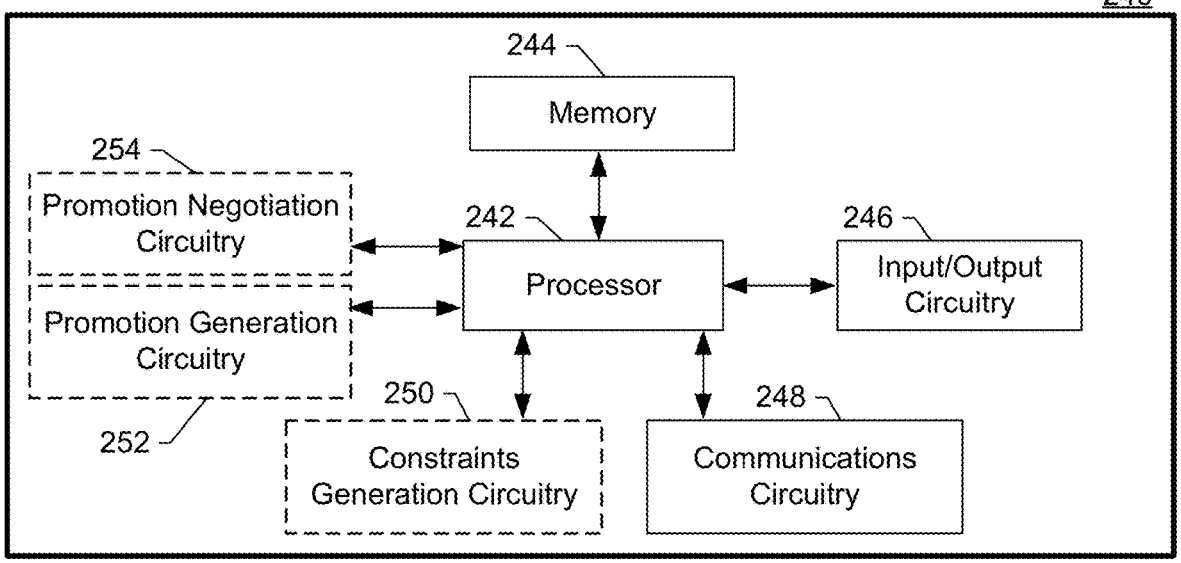
Figure 3:
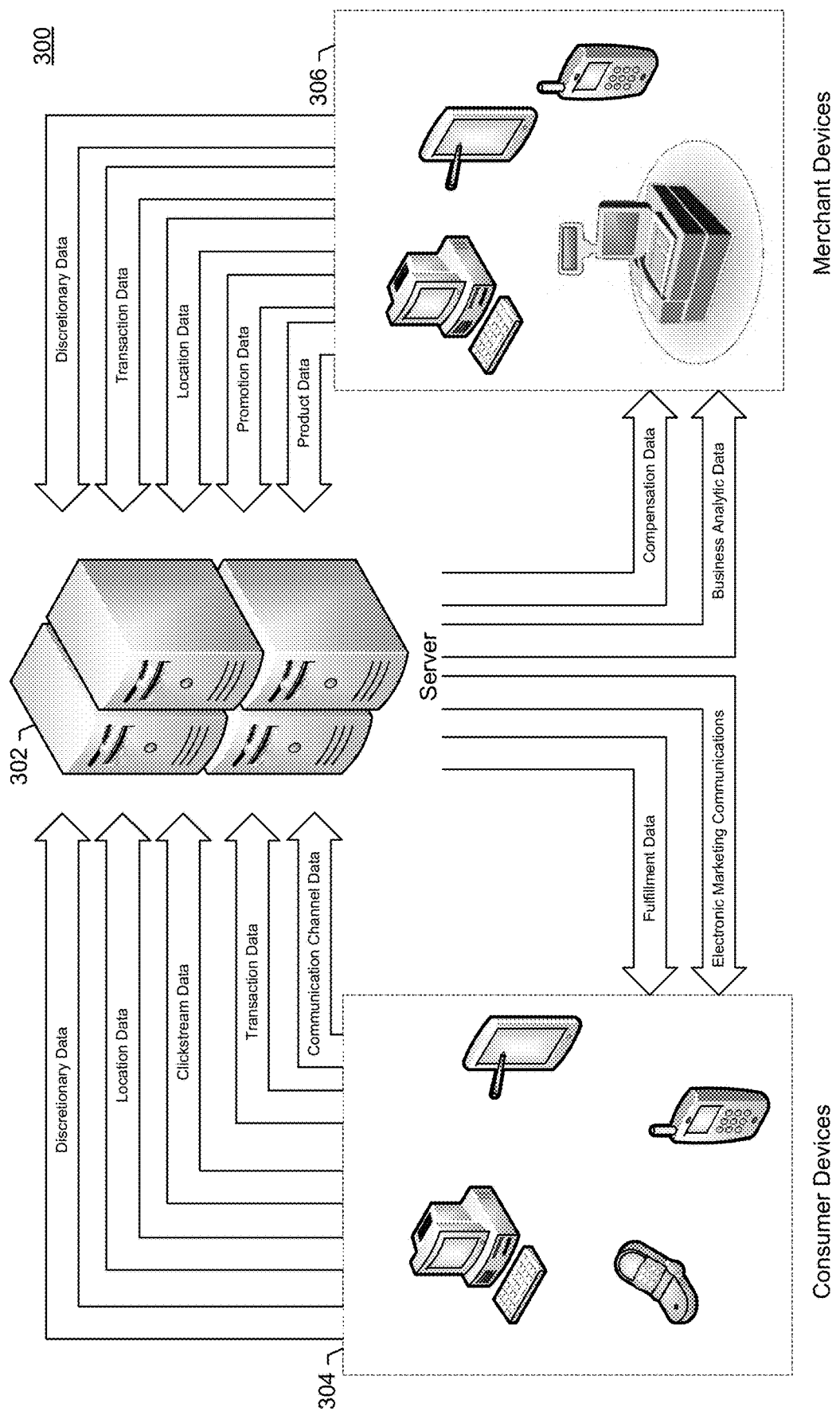
Figure 4:
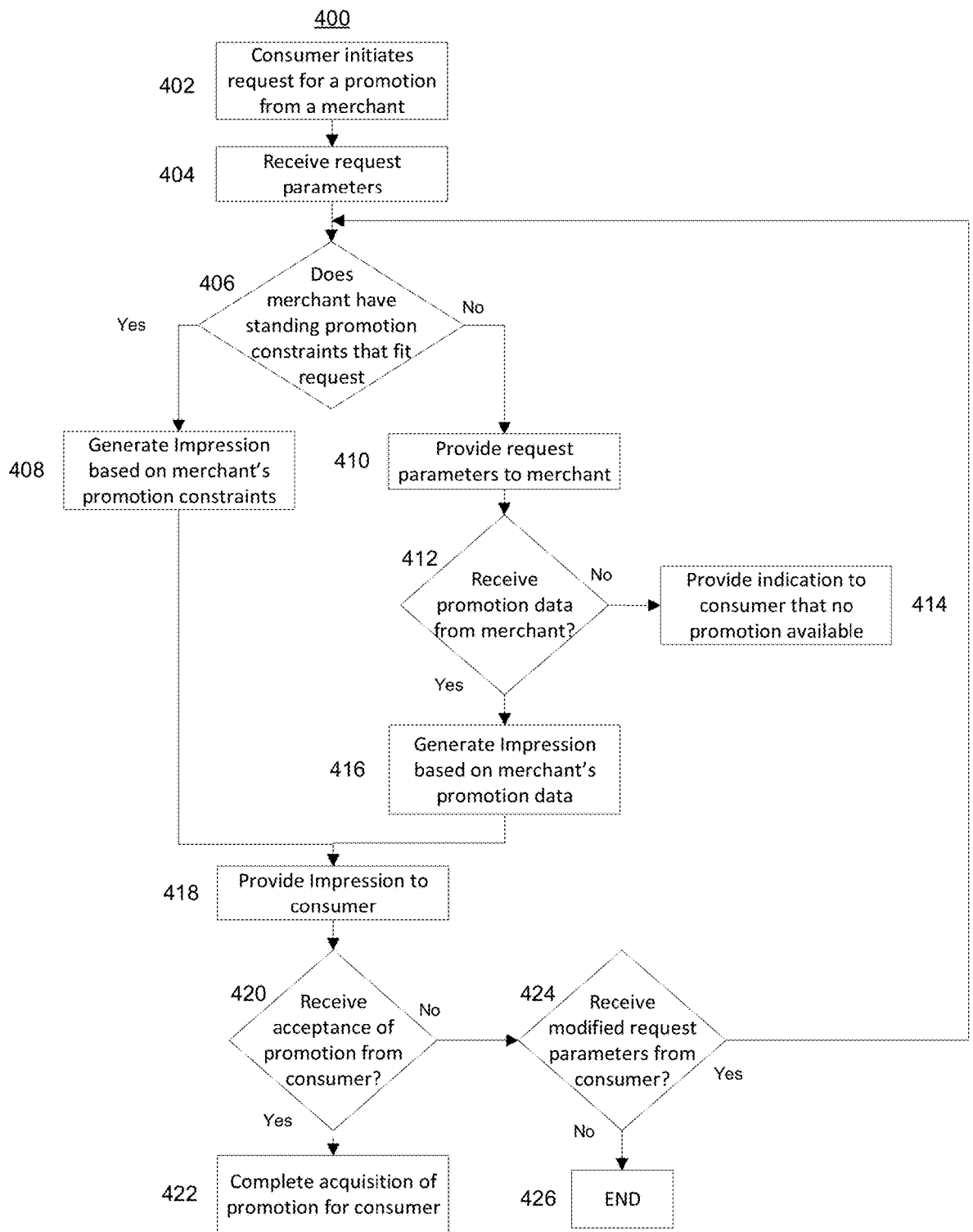
Figure 5:
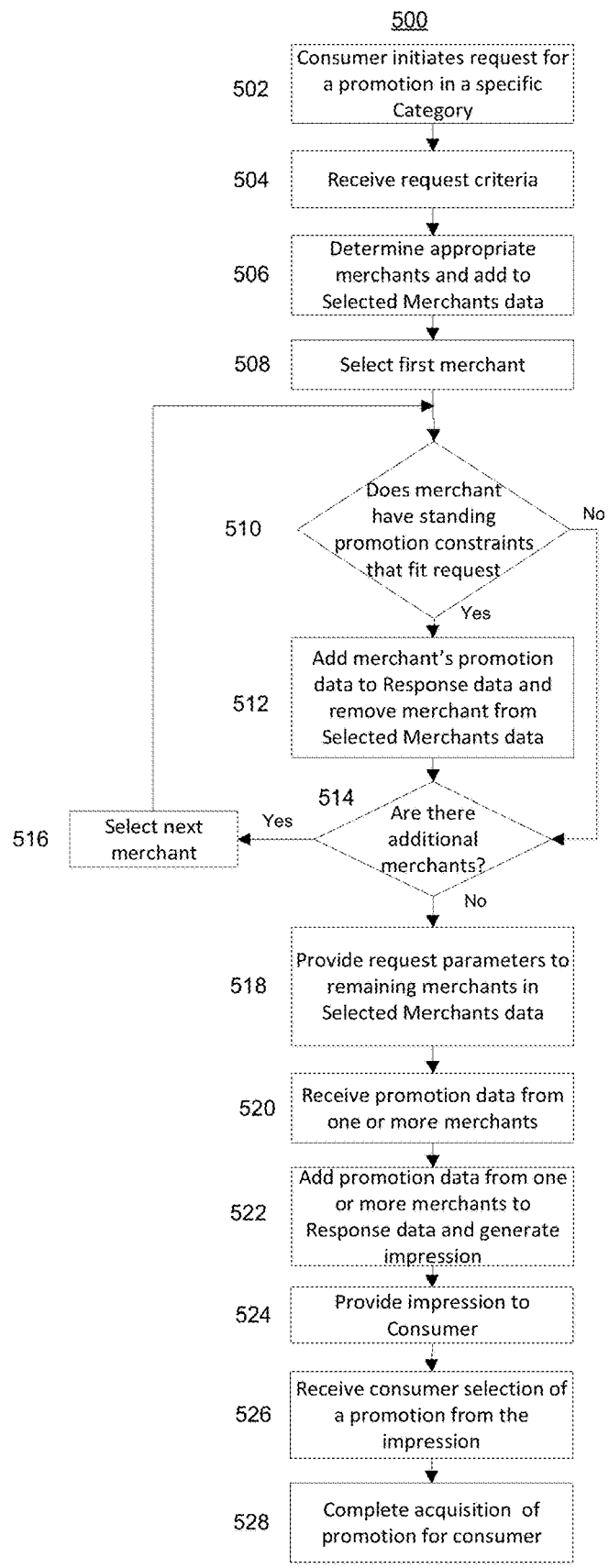
Figure 6:
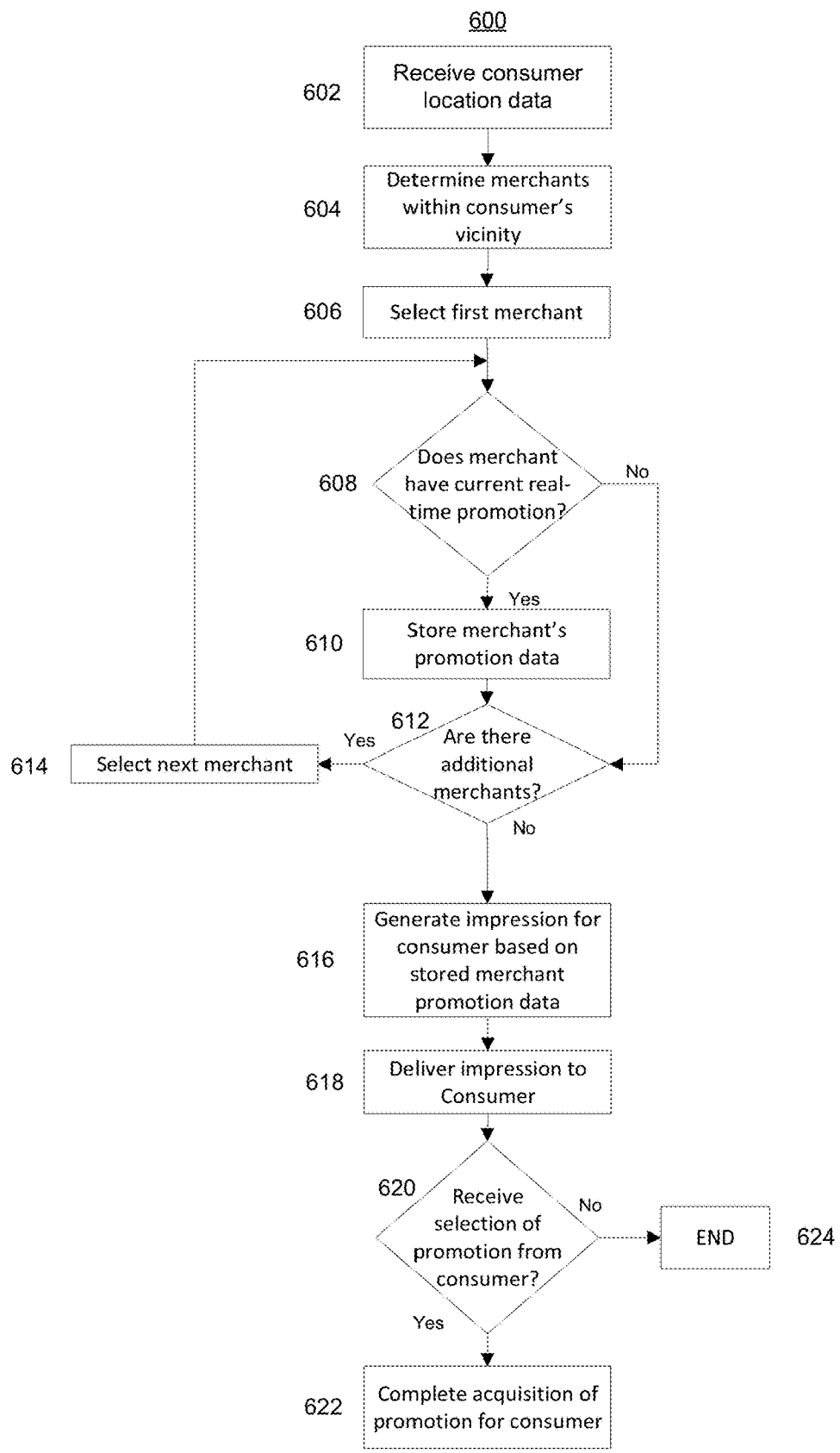
Figure 7:
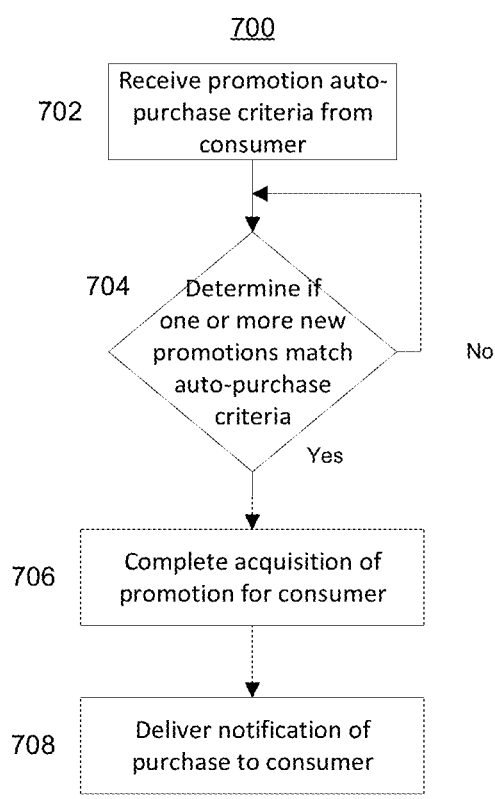
Figure 8:
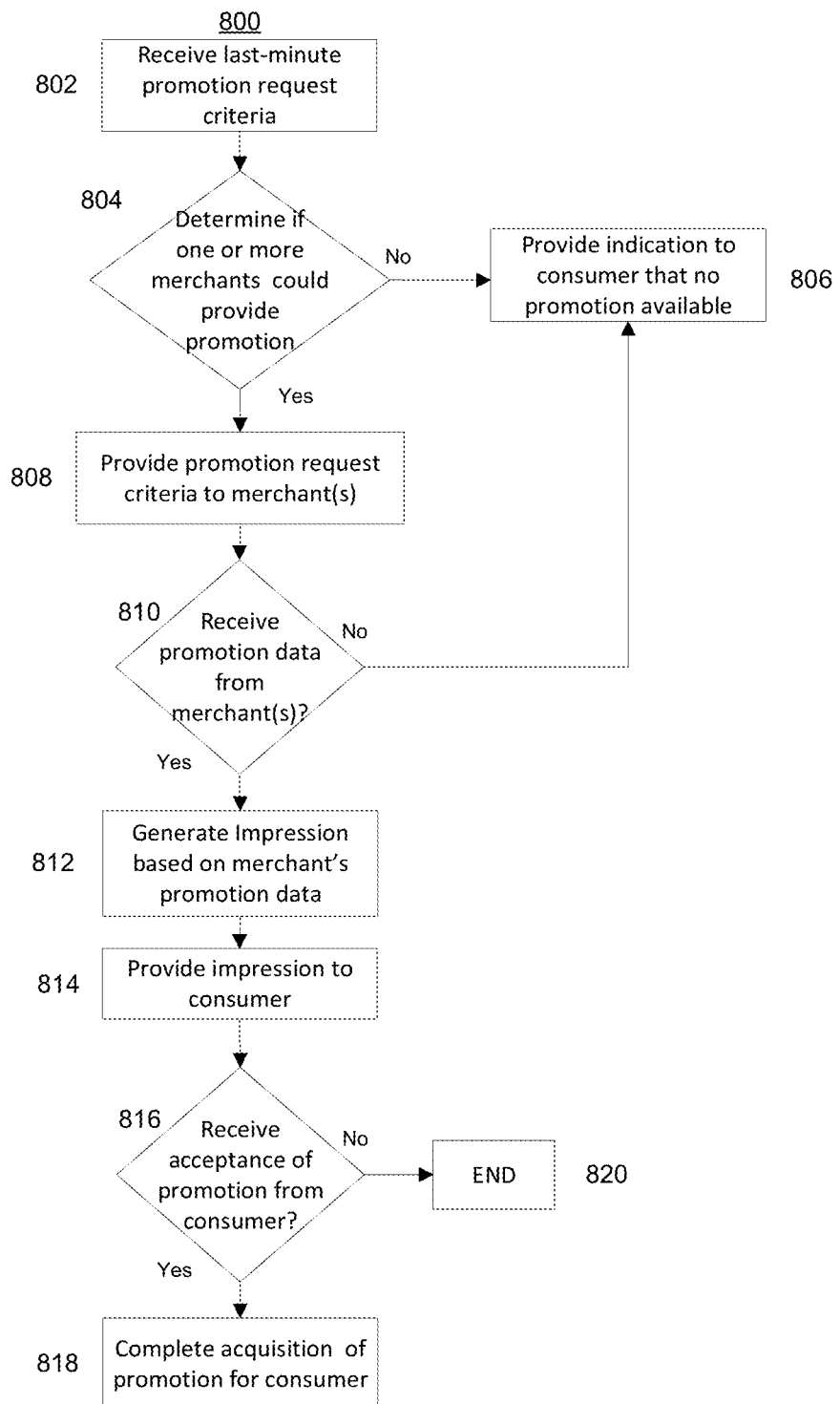
Figure 9:
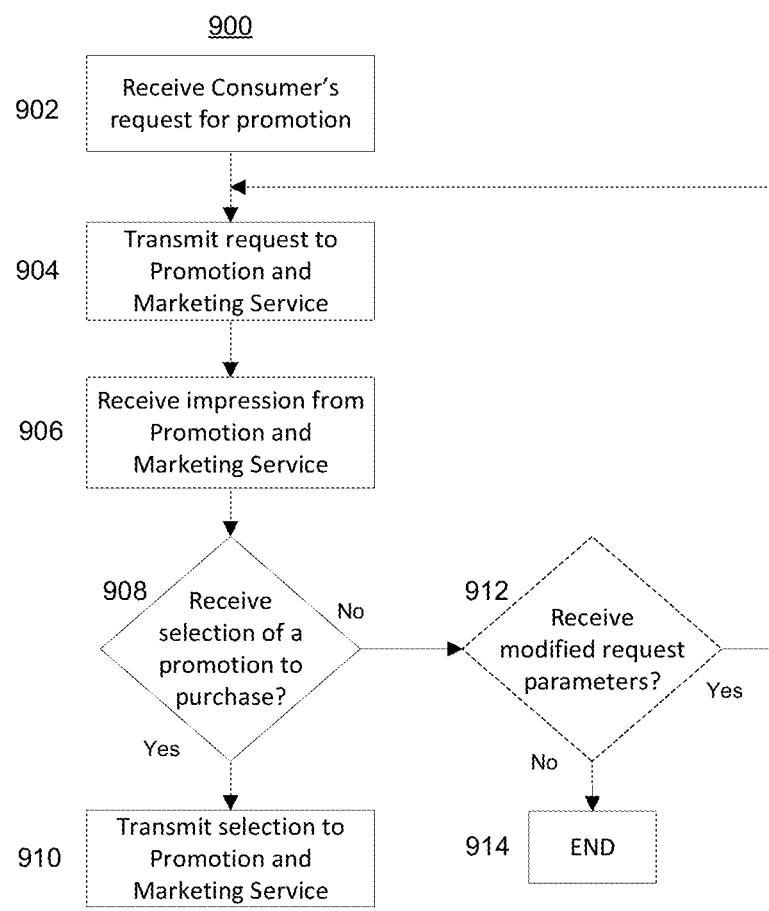
Figure 10:
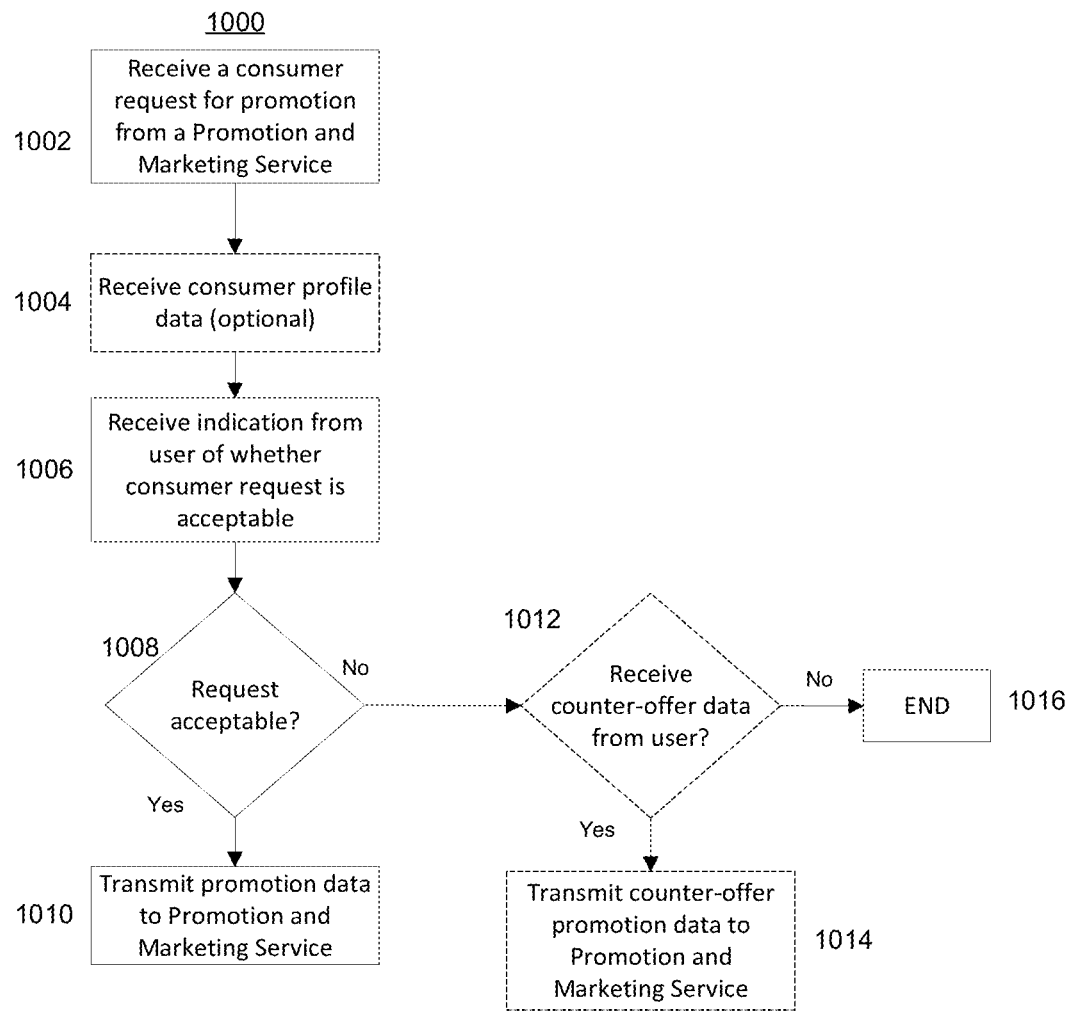

Having thus described embodiments of the invention in general terms, reference will now be made to the accompanying drawings, which are not necessarily drawn to scale, and wherein:

FIG. 1 illustrates an example computing system within which embodiments of the present invention may operate;

FIGS. 2A-C illustrate block diagrams of example apparatuses which may be configured to provide operations in accordance with some example embodiments discussed herein;

FIG. 3 depicts an example data flow illustrating interactions between apparatus that may be provided in a computing system in accordance with some example embodiments discussed herein;

FIG. 4 illustrates a flowchart of exemplary operations that may be executed by one or more apparatuses to facilitate the negotiation and generation of one or more promotions between a consumer and a merchant in accordance with some example embodiments discussed herein;

FIG. 5 illustrates a flowchart of exemplary operations that may be executed by one or more apparatuses to facilitate the search for promotions and the generation of one or more promotions for a consumer in accordance with some example embodiments discussed herein;

FIG. 6 illustrates a flowchart of exemplary operations that may be executed by one or more apparatuses to facilitate the offering of current and/or short term promotions to a consumer based on the consumers current location in accordance with some example embodiments discussed herein;

FIG. 7 illustrates a flowchart of exemplary operations that may be executed by one or more apparatuses to facilitate the automatic purchase of promotions for a consumer that meet pre-established criteria in accordance with some example embodiments discussed herein;

FIG. 8 illustrates a flowchart of exemplary operations that may be executed by one or more apparatuses to facilitate the search for promotions for a specific activity by a consumer in accordance with some example embodiments discussed herein;

FIG. 9 illustrates a flowchart of exemplary operations that may be executed by one or more apparatuses to facilitate the negotiation and generation of one or more promotions between a consumer and a merchant in accordance with some example embodiments discussed herein; and FIG. 10 illustrates a flowchart of exemplary operations that may be executed by one or more apparatuses to facilitate the negotiation and generation of one or more promotions between a consumer and a merchant in accordance with some example embodiments discussed herein.

DETAILED DESCRIPTION

Embodiments of the present invention now will be described more fully hereinafter with reference to the accompanying drawings, in which some, but not all embodiments of the inventions are shown. Indeed, embodiments of the invention may be embodied in many different forms and should not be construed as limited to the embodiments set forth herein; rather, these embodiments are provided so that this disclosure will satisfy applicable legal requirements. Like numbers refer to like elements throughout.

Overview

Various embodiments of the present invention are directed to improved apparatuses, methods, and computer readable media for providing a real-time marketplace allowing consumers and merchants to participate in a bidding system for transactions. Embodiments provide for a system whereby consumers and merchants may generate promotions, which are specific to the consumer and merchant, for a particular transaction and/or available during a particular time period.

In some embodiments, a promotion and marketing service may facilitate a real-time marketplace whereby consumers and merchants may participate in a bidding system for the generation and acquisition of promotions. For example, in some embodiments, a consumer who is in the vicinity of a specific merchant may instigate a negotiation with the merchant, through the promotion and marketing service, for a promotion redeemable in a short time period, such as by requesting a specific discount for a transaction if the consumer visits the merchant and competes the transaction within a short time, e.g. the next hour. In some embodiments, the merchant may be able to respond to a consumer's promotion request in a number of manners. For example, if the promotion terms (e.g. the specific discount and time period) requested by the consumer are acceptable to the merchant, the merchant may provide an indication to the consumer (through the promotion and marketing service) that the terms are acceptable. The promotion and marketing service may then facilitate the consumer accepting the promotion terms and facilitate the acquisition of the promotion by the consumer.

In some embodiments, the merchant may instead provide a counter-offer proposing a promotion on alternate terms that are acceptable to the merchant. The real-time marketplace may facilitate multiple iterations of counter-offers between the consumer and merchant to allow the consumer and merchant to agree on promotion terms that are mutually acceptable. In some embodiments, after the consumer and merchant have agreed on the promotion terms, the promotion and marketing service may facilitate the acquisition of the promotion by the consumer.

In some embodiments, a promotion and marketing service may facilitate a real-time marketplace whereby consumers may request availability of promotions using a specified criteria, for example for a category, such as restaurants, activities, shopping, etc., around the consumers location or in a defined area, and/or during a specified time period. Such a real-time marketplace may provide for searching for and generating one or more promotions for a specific transaction that is specific to an individual consumer for an individual merchant and which may be provided for a limited time period and/or may be redeemable in a limited time period. For example, in some embodiments, a consumer who is in a certain neighborhood may instigate a search for a promotion at a particular type of restaurant within a certain distance. In some embodiments, the promotion and marketing system may determine the appropriate merchants in the area and determine if the merchant has a current promotion or may solicit the merchants for a promotion for the consumer. The promotion and marketing service may then facilitate the consumer accepting the promotion terms and facilitate the acquisition of the promotion by the consumer.

Definitions

Some embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As used herein, the terms "data," "content," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, hosts, and/or the like.

As used herein, the term "promotion and marketing service" may include a service that is accessible via one or more computing devices and that is operable to provide promotion and/or marketing services on behalf of one or more providers that are offering one or more instruments that are redeemable for goods, services, experiences and/or the like. In some examples, the promotion and marketing service may take the form of a redemption authority, a payment processor, a rewards provider, an entity in a financial network, a promoter, an agent, and/or the like. As such, the service is, in some example embodiments, configured to present one or more promotions via one or more impressions, accept payments for promotions from consumers, issue instruments upon acceptance of an offer, participate in redemption, generate rewards, provide a point of sale device or service, issue payments to providers and/or or otherwise participate in the exchange of goods, services or experiences for currency, value and/or the like. The service is also, in some example embodiments, configured to offer merchant services such as promotion building (e.g., assisting merchants with selecting parameters for newly created promotions), promotion counseling (e.g., offering information to merchants to assist with using promotions as marketing), promotion analytics (e.g., offering information to merchants to provide data and analysis regarding the costs and return-on-investment associated with offering promotions), and the like.

As used herein, the terms "provider" and "merchant" may be used interchangeably and may include, but are not limited to, a business owner, consigner, shopkeeper, tradesperson, vendor, operator, entrepreneur, agent, dealer, organization or the like that is in the business of a providing a good, service or experience to a consumer, facilitating the provision of a good, service or experience to a consumer and/or otherwise operating in the stream of commerce. The "provider" or "merchant" need not actually market a product or service via the promotion and marketing service, as some merchants or providers may utilize the promotion and marketing service only for the purpose of gathering marketing information, demographic information, or the like.

As used herein, the term "consumer" should be understood to refer to a recipient of goods, services, promotions, media, or the like provided by the promotion and marketing service and/or a merchant. Consumers may include, without limitation, individuals, groups of individuals, corporations, other merchants, and the like.

As used herein, the term "promotion" may include, but is not limited to, any type of offered, presented or otherwise indicated reward, discount, coupon, credit, deal, incentive, discount, media or the like that is indicative of a promotional value or the like that upon purchase or acceptance results in the issuance of an instrument that may be used toward at least a portion of the purchase of particular goods, services and/or experiences defined by the promotion. Promotions may have different values in different contexts. For example, a promotion may have a first value associated with the cost paid by a consumer, known as an "accepted value." When redeemed, the promotion may be used to purchase a "promotional value" representing the retail price of the goods. The promotion may also have a "residual value," reflecting the remaining value of the promotion after expiration. Although consumers may be primarily focused on the accepted and promotional value of the promotion, a promotion may also have additional associated values. For example, a "cost value" may represent the cost to the merchant to offer the promotion via the promotion and marketing service, where the promotion and marketing service receives the cost value for each promotion sold to a consumer. The promotion may also include a "return on investment" value, representing a quantified expected return on investment to the merchant for each promotion sold.

For example, consider a promotion offered by the promotion and marketing service for a $50 meal promotion for $25 at a particular restaurant. In this example, $25 would be the accepted value charged to the consumer. The consumer would then be able to redeem the promotion at the restaurant for $50 applied toward their meal check. This $50 would be the promotional value of the promotion. If the consumer did not use the promotion before expiration, the consumer might be able to obtain a refund of $22.50, representing a 10% fee to recoup transaction costs for the merchant and/or promotion and marketing service. This $22.50 would be the residual value of the promotion. If the promotion and marketing service charged the merchant $3.00 to offer the promotion, the $3.00 fee would be the "cost value." The "return on investment" value of the promotion might be dynamically calculated by the promotion and marketing service based on the expected repeat business generated by the marketing of the promotion, the particular location, the demographics of the consumer, and the like. For example, the return on investment value might be $10.00, reflecting the long term additional profit expected by the merchant as a result of bringing in a new customer through use of a promotion.

Promotions may be provided to consumers and redeemed via the use of an "instrument." Instruments may represent and embody the terms of the promotion from which the instrument resulted. For example, instruments may include, but are not limited to, any type of physical token (e.g., magnetic strip cards or printed barcodes), virtual account balance (e.g., a promotion being associated with a particular user account on a merchant website), secret code (e.g., a character string that can be entered on a merchant website or point-of-sale), tender, electronic certificate, medium of exchange, voucher, or the like which may be used in a transaction for at least a portion of the purchase, acquisition, procurement, consumption or the like of goods, services and/or experiences as defined by the terms of the promotion.

In some examples, the instrument may take the form of tender that has a given value that is exchangeable for goods, services and/or experiences and/or a reduction in a purchase price of a particular good, service, or experience. In some examples, the instrument may have multiple values, such as accepted value, a promotional value, and/or a residual value. For example, using the aforementioned restaurant as the example provider, an electronic indication in a mobile application that shows $50 of value to be used as payment for a meal check at the restaurant. In some examples, the accepted value of the instrument is defined by the value exchanged for the instrument. In some examples, the promotional value is defined by the promotion from which the instrument resulted and is the value of the instrument beyond the accepted value. In some examples, the residual value is the value after redemption, the value after the expiry or other violation of a redemption parameter, the return or exchange value of the instrument and/or the like.

As used herein, the term "redemption" refers to the use, exchange or other presentation of an instrument for at least a portion of a good, service, or experience as defined by the instrument and its related promotion. In some examples, redemption includes the verification of validity of the instrument. In other example embodiments, redemption may include an indication that a particular instrument has been redeemed and thus no longer retains an actual, promotional, and/or residual value (e.g., full redemption). In other example embodiments, redemption may include the redemption of at least a portion of its actual, promotional, and/or residual value (e.g., partial redemption). An example of redemption, using the aforementioned restaurant as the example provider, is the exchange of the $50 instrument and $50 to settle a $100 meal check.

As used herein, the term "impression" refers to a metric for measuring how frequently consumers are provided with marketing information related to a particular good, service, or promotion. Impressions may be measured in various different manners, including, but not limited to, measuring the frequency with which content is served to a consumer (e.g., the number of times images, websites, or the like are requested by consumers), measuring the frequency with which electronic marketing communications including particular content are sent to consumers (e.g., a number of e-mails sent to consumers or number of e-mails including particular promotion content), measuring the frequency with which electronic marketing communications are received by consumers (e.g., a number of times a particular e-mail is read), or the like. Impressions may be provided through various forms of media, including but not limited to communications, displays, or other perceived indications, such as e-mails, text messages, application alerts, mobile applications, other type of electronic interface or distribution channel and/or the like, of one or more promotions.

As used herein, the term "electronic marketing information" refers to various electronic data and signals that may be interpreted by a promotion and marketing service to provide improved electronic marketing communications. Electronic marketing information may include, without limitation, clickstream data (defined below), transaction data (defined below), location data (defined below), communication channel data (defined below), discretionary data (defined below), or any other data stored by or received by the promotion and marketing service for use in providing electronic communications to consumers.

As used herein, the term "clickstream data" refers to electronic information indicating content viewed, accessed, edited, or retrieved by consumers. This information may be electronically processed and analyzed by a promotion and marketing service to improve the quality of electronic marketing and commerce transactions offered by, through, and in conjunction with the promotion and marketing service. It should be understood that the term "clickstream" is not intended to be limited to mouse clicks. For example, the clickstream data may include various other consumer interactions, including without limitation, mouse-over events and durations, the amount of time spent by the consumer viewing particular content, the rate at which impressions of particular content result in sales associated with that content, demographic information associated with each particular consumer, data indicating other content accessed by the consumer (e.g., browser cookie data), the time or date on which content was accessed, the frequency of impressions for particular content, associations between particular consumers or consumer demographics and particular impressions, and/or the like.

As used herein, the term "transaction data" refers to electronic information indicating that a transaction is occurring or has occurred via either a merchant or the promotion and marketing service. Transaction data may also include information relating to the transaction. For example, transaction data may include consumer payment or billing information, consumer shipping information, items purchased by the consumer, a merchant rewards account number associated with the consumer, the type of shipping selected by the consumer for fulfillment of the transaction, or the like.

As used herein, the term "location data" refers to electronic information indicating a particular location. Location data may be associated with a consumer, a merchant, or any other entity capable of interaction with the promotion and marketing service. For example, in some embodiments location data is provided by a location services module of a consumer mobile device. In some embodiments, location data may be provided by a merchant indicating the location of consumers within their retail location. In some embodiments, location data may be provided by merchants to indicate the current location of the merchant (e.g., a food truck or delivery service). It should be appreciated that location data may be provided by various systems capable of determining location information, including, but not limited to, global positioning service receivers, indoor navigation systems, cellular tower triangulation techniques, video surveillance systems, or radio frequency identification (RFID) location systems.

As used herein, the term "communication channel data" refers to electronic information relating to the particular device or communication channel upon which a merchant or consumer communicates with the promotion and marketing service. In this regard, communication channel data may include the type of device used by the consumer or merchant (e.g., smart phone, desktop computer, laptop, netbook, tablet computer), the Internet Protocol (IP) address of the device, the available bandwidth of a connection, login credentials used to access the channel (e.g., a user account and/or password for accessing the promotion and marketing service), or any other data pertaining to the communication channel between the promotion and marketing service and an entity external to the promotion and marketing service.

As used herein, the term "discretionary data" refers to electronic information provided by a merchant or consumer explicitly to the promotion and marketing service in support of improved interaction with the promotion and marketing service. Upon registering with the promotion and marketing service or at any time thereafter, the consumer or merchant may be invited to provide information that aids the promotion and marketing service in providing services that are targeted to the particular needs of the consumer or merchant. For example, a consumer may indicate interests, hobbies, their age, gender, or location when creating a new account. A merchant may indicate the type of goods or services provided, their retail storefront location, contact information, hours of operation, or the like.

It should be appreciated that the term "discretionary data" is intended to refer to information voluntarily and explicitly provided to the promotion and marketing service, such as by completing a form or survey on a website or application hosted by the promotion and marketing service. However, is should be appreciated that the examples of discretionary data provided above may also be determined implicitly or through review or analysis of other electronic marketing information provided to the promotion and marketing service. It should also be appreciated that the promotion and marketing service may also gate access to certain features or tools based on whether certain discretionary data has been provided. For example, the consumer may be required to provide information relating to their interests or location during a registration process.

As used herein, the term "offering parameters" refers to terms and conditions under which the promotion is offered by a promotion and marketing service to consumers. These offering parameters may include parameters, bounds, considerations and/or the like that outline or otherwise define the terms, timing, constraints, limitations, rules or the like under which the promotion is sold, offered, marketed, or otherwise provided to consumers. Example offering parameters include, using the aforementioned restaurant as the example provider, limit one instrument per person, total of 100 instruments to be issued, a run duration of when the promotion will be marketed via the promotion and marketing service, and parameters for identifying consumers to be offered the promotion (e.g., factors influencing how consumer locations are used to offer a promotion).

As used herein, the term "redemption parameters" refers to terms and conditions for redeeming or otherwise obtaining the benefit of promotions obtained from a promotion and marketing service. The redemption parameters may include parameters, bounds, considerations and/or the like that outline the term, timing, constraints, limitations, rules or the like for how and/or when an instrument may be redeemed. For example, the redemption parameters may include an indication that the instrument must be redeemed prior to a specified deadline, for a specific good, service or experience and/or the like. For example, using the aforementioned restaurant as the example provider, the redemption parameters may specify a limit of one instrument per visit, that the promotion must be used in store only, or that the promotion must be used by a certain date.

As used herein, the term "promotion content" refers to display factors or features that influence how the promotion is displayed to consumers. For example, promotion content may include an image associated with the promotion, a narrative description of the promotion or the merchant, a display template for association with the promotion, or the like. For example, merchant self-service indicators (defined below) may be used to identify promotion offers that were generated by merchants with similar characteristics to the merchant self-service indicators. Various other factors may be used to generate the promotion offer, such as the success of the promotion offers generated by the merchants with similar characteristics, the product availability of the merchant, and the like.

As used herein, the term "promotion component" is used to refer to elements of a particular promotion that may be selected during a promotion generation process. Promotion components may include any aspect of a promotion, including but not necessarily limited to offering parameters, redemption parameters, and promotion content. For example, promotion components may include, but are not limited to, promotion titles, promotion ledes (e.g., a short text phrase displayed under a promotion title), promotion images, promotion prices, promotion discount levels, promotion style sheets, promotion fonts, promotion e-mail subjects, promotion quantities, promotion fine print options, promotion fees assessed to the merchant by the promotion and marketing service, or the like. Promotion components may also include various flags and settings associated with registration and verification functions for a merchant offering the promotion, such as whether the identity of the merchant has been verified, whether the merchant is registered with the promotion and marketing service, or the like.

As used herein, the term "electronic marketing communication" refers to any electronically generated information content provided by the promotion and marketing service to a consumer for the purpose of marketing a promotion, good, or service to the consumer. Electronic marketing communications may include any email, short message service (SMS) message, web page, application interface, or the like electronically generated for the purpose of attempting to sell or raise awareness of a product, service, promotion, or merchant to the consumer.

It should be appreciated that the term "electronic marketing communication" implies and requires some portion of the content of the communication to be generated via an electronic process. For example, a telephone call made from an employee of the promotion and marketing service to a consumer for the purpose of selling a product or service would not qualify as an electronic marketing communication, even if the identity of the call recipient was selected by an electronic process and the call was dialed electronically, as the content of the telephone call is not generated in an electronic manner. However, a so-called "robo-call" with content programmatically selected, generated, or recorded via an electronic process and initiated by an electronic system to notify a consumer of a particular product, service, or promotion would qualify as an electronic marketing communication. Similarly, a manually drafted e-mail sent from an employee of the promotion and marketing service to a consumer for the purpose of marketing a product would not qualify as an electronic marketing communication. However, a programmatically generated email including marketing materials programmatically selected based on electronic marketing information associated with the recipient would qualify as an electronic marketing communication.

As used herein, the term "business analytic data" refers to data generated by the promotion and marketing service based on electronic marketing information to assist with the operation of the promotion and marketing service and/or one or more merchants. The various streams of electronic marketing information provided to and by the promotion and marketing service allow for the use of sophisticated data analysis techniques that may be employed to identify correlations, relationships, and other associations among elements of electronic marketing information. These associations may be processed and formatted by the promotion and marketing service to provide reports, recommendations, and services both internal to the promotion and marketing service and to merchants in order to improve the process by which merchants and promotion and marketing service engage with consumers. For example, the promotion and marketing service may analyze the electronic marketing information to identify an increased demand for a particular product or service, and provide an electronic report to a merchant suggesting the merchant offer the particular product or service. Alternatively, the promotion and marketing service may identify that a particular product or service is not selling or resulting in the merchant losing money, customers, or market share (e.g., after consumers order a particular menu item, they never come back to the merchant), and suggest that the merchant should discontinue offering that product or service.

It should be appreciated that the term "business analytic data" is intended to refer to electronically and programmatically generated data. For example, a printed report or letter manually drafted by an employee of the promotion and marketing service would not be said to include business analytic data, even if said data was used by the employee during the drafting process, while a data disk or downloaded file containing analytics generated by the promotion and marketing service would be considered business analytic data.

Technical Underpinnings and Implementation of Exemplary Embodiments

Merchants, including manufacturers, wholesalers, and retailers, have spent a tremendous amount of time, money, manpower, and other resources to determine the best way to market their products to consumers. Whether a given marketing effort is successful is often determined based on the return-on-investment offered to the merchant from increased awareness, sales, and the like of the merchant's goods and services in exchange for the resources spent on the marketing effort. In other words, optimal marketing techniques generally maximize the benefit to the merchant's bottom line while minimizing the cost spent on marketing. To this end, a merchant's marketing budget may be spent in a variety of different manners including advertising, offering of discounts, conducting market research, and various other known marketing techniques. The end goal of these activities is to ensure that products are presented to consumers in a manner that maximizes the likelihood that the consumers will purchase the product from the merchant that performed the marketing activities while minimizing the expense of the marketing effort.

The advent of electronic commerce has revolutionized the marketing process. While merchants would typically have to perform costly market research such as focus groups, surveys, and the like to obtain detailed information on consumer preferences and demographics, the digital age has provided a wealth of new consumer information that may be used to optimize the marketing and sales process. As a result, new technologies have been developed to gather, aggregate, analyze, and report information from a variety of electronic sources.

So-called "clickstream data" provides a robust set of information describing the various interactions consumers have with electronic marketing information provided to them by merchants and others. Promotion and marketing services have been developed with sophisticated technology to receive and process this data for the benefit of both merchants and consumers. These services assist merchants with marketing their products to interested consumers, while reducing the chance that a consumer will be presented with marketing information in which the consumer has no interest. Some promotion and marketing services further leverage their access to the trove of electronic marketing information to assist merchants and consumers with other tasks, such as offering improved merchant point-of-sale systems, improved inventory and supply chain management, improved methods for delivering products and services, and the like.

Unlike conventional marketing techniques related to the use of paper or other physical media (e.g., coupons clipped from a weekly newspaper), promotion and marketing services offer a wealth of additional electronic solutions to improve the experience for consumers and merchants. The ability to closely monitor user impressions provides the ability for the promotion and marketing service to gather data related to the time, place, and manner in which the consumer engaged with the impression (e.g., viewed, clicked, moused-over) and obtained and redeemed the promotion. The promotion and marketing service may use this information to determine which products and services are most relevant to the consumer's interest, and to provide marketing materials related to said products and services to the consumer, thus improving the quality of the electronic marketing communications received by the consumer. Merchants may be provided with the ability to dynamically monitor and adjust the parameters of promotions offered by the promotion and marketing service, ensuring that the merchant receives a positive return on their investment. For example, the merchant can closely monitor the type, discount level, and quantity sold of a particular promotion on the fly, while with traditional printed coupons the merchant would not be able to make any changes to the promotion after the coupon has gone to print. Each of these advancements in digital market and promotion distribution involve problems unique to the digital environment not before seen in traditional print or television broadcast marketing.

However, these promotion and marketing services are not without problems. Although the clickstream data provides a wealth of information, the inventors have determined that existing techniques may not always leverage this information in an efficient or accurate manner. Technology continues to rapidly advance in the field of analytics and the processing of this information, offering improved data gathering and analysis techniques, resulting in more relevant and accurate results provided in a more efficient manner. Electronic marketing services continue to evolve and provide improved methods for engaging consumers and spreading awareness of products offered by promotion and marketing services.

In many cases, the inventors have determined that these services are constrained by technological obstacles unique to the electronic nature of the services provided, such as constraints on data storage, machine communication and processor resources. The inventors have identified that the wealth of electronic data available to these services and the robust nature of electronic marketing communications techniques present new challenges never contemplated in the world of paper coupons and physical marketing techniques. The inventors have further determined that even technological methods that leverage computers for statistical analysis and consumer behavior modeling (e.g., television rating systems) fail to address problems associated with providing relevant, high quality electronic marketing communications (e.g., impressions) to consumers in a manner that maximizes accuracy, minimizes error, is user friendly and provides for efficient allocation of resources. Embodiments of the present invention as described herein serve to correct these errors and offer improved resource utilization, thus providing improvements to electronic marketing services that address problems arising out of the electronic nature of those services.

In order to offer digital promotions through a promotion and marketing service, merchants generally manually engage with representatives of the promotion and marketing service to negotiate the components of the promotions to be offered to consumers by the promotion and marketing service. This process generally provides for blanket promotions that are targeted to a variety of consumers. Such blanket promotions do not allow for merchants to offer timely promotions targeted to a specific consumer or particular group of consumers on a real-time basis. For example, such blanket promotions do not allow for merchants to offer promotions to specific consumers, e.g. consumers in the vicinity, for a specific time period, e.g. next two hours, to allow for a merchant to utilize currently available capacity.

The inventors have identified various problems and difficulties that occur in providing merchants with the opportunity to create and sell blanket promotions and with facilitating a merchant providing limited promotions to utilize current capacity. In particular, the inventors have determined that the process of generating a new promotion requires direct manual intervention with a promotion and marketing service and requires providing general promotions directed to a variety of consumers generally over an extended time period.

The inventors have therefore determined that existing electronic systems for generating promotions fail to address these issues. As a result of these problems and others that may arise from time to time, delays and inefficiencies may be introduced into the process of generating a promotion and may not allow a merchant to tailor promotions to specific consumers during specific time periods. In many cases, generation of such real-time promotions and facilitation of negotiations between consumers and a merchant may be completely impossible without purchasing additional applications, devices, or other tools.

System Architecture and Example Apparatus

Methods, apparatuses, and computer program products of the present invention may be embodied by any of a variety of devices. For example, the method, apparatus, and computer program product of an example embodiment may be embodied by a networked device, such as a server or other network entity, configured to communicate with one or more devices, such as one or more client devices. Additionally or alternatively, the computing device may include fixed computing devices, such as a personal computer or a computer workstation. Still further, example embodiments may be embodied by any of a variety of mobile terminals, such as a portable digital assistant (PDA), mobile telephone, smartphone, laptop computer, tablet computer, or any combination of the aforementioned devices.

In this regard, FIG. 1 discloses an example computing system within which embodiments of the present invention may operate. Merchants may access a promotion and marketing service 102 via a network 112 (e.g., the Internet, or the like) using computer devices 108A through 108N and 110A through 110N, respectively (e.g., one or more consumer devices 108A-108N or one or more merchant devices 110A-110N). Moreover, the promotion and marketing service 102 may comprise a server 104 in communication with a database 106.

The server 104 may be embodied as a computer or computers as known in the art. The server 104 may provide for receiving of electronic data from various sources, including but not necessarily limited to the consumer devices 108A-108N and the merchant devices 110A-110N. For example, the server 104 may be operable to receive and process clickstream data provided by the consumer devices 108 and/or the merchant devices 110. The server 104 may also facilitate e-commerce transactions based on transaction information provided by the consumer devices 108 and/or the merchant devices 110. The server 104 may facilitate the generation and providing of various electronic communications and marketing materials based on the received electronic data.

The database 106 may be embodied as a data storage device such as a Network Attached Storage (NAS) device or devices, or as a separate database server or servers. The database 106 includes information accessed and stored by the server 104 to facilitate the operations of the promotion and marketing service 102. For example, the database 106 may include, without limitation, user account credentials for system administrators, merchants, and consumers, data indicating the products and promotions offered by the promotion and marketing service, clickstream data, analytic results, reports, financial data, and/or the like.

The consumer devices 108A-108N may be any computing device as known in the art and operated by a consumer. Electronic data received by the server 104 from the consumer devices 108A-108N may be provided in various forms and via various methods. For example, the consumer devices 108A-108N may include desktop computers, laptop computers, smartphones, netbooks, tablet computers, wearables, and the like. The information may be provided through various sources on these consumer devices.

In embodiments where a consumer device 108 is a mobile device, such as a smart phone or tablet, the consumer device 108 may execute an "app" to interact with the promotion and marketing service 102. Such apps are typically designed to execute on mobile devices, such as tablets or smartphones. For example, an app may be provided that executes on mobile device operating systems such as Apple Inc.'s iOS®, Google Inc.'s Android®, or Microsoft Inc.'s Windows8®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications in a manner that allows for improved interactions between apps while also preserving the privacy and security of consumers. In some embodiments, a mobile operating system may also provide for improved communication interfaces for interacting with external devices (e.g., home automation systems, indoor navigation systems, and the like). Communication with hardware and software modules executing outside of the app is typically provided via application programming interfaces (APIs) provided by the mobile device operating system.

The promotion and marketing service 102 may leverage the application framework offered by the mobile operating system to allow consumers to designate which information is provided to the app and which may then be provided to the promotion and marketing service 102. In some embodiments, consumers may "opt in" to provide particular data to the promotion and marketing service 102 in exchange for a benefit, such as improved relevancy of marketing communications offered to the user. In some embodiments, the consumer may be provided with privacy information and other terms and conditions related to the information provided to the promotion and marketing service 102 during installation or use of the app. Once the consumer provides access to a particular feature of the mobile device, information derived from that feature may be provided to the promotion and marketing service 102 to improve the quality of the consumer's interactions with the promotion and marketing service.

For example, the consumer may indicate that they wish to provide location information to the app from location services circuitry included in their mobile device. Providing this information to the promotion and marketing service 102 may enable the promotion and marketing service 102 to offer promotions to the consumer that are relevant to the particular location of the consumer (e.g., by providing promotions for merchants proximate to the consumer's current location). It should be appreciated that the various mobile device operating systems may provide the ability to regulate the information provided to the app associated with the promotion and marketing service 102. For example, the consumer may decide at a later point to disable the ability of the app to access the location services circuitry, thus limiting the access of the consumer's location information to the promotion and marketing service 102.

Various other types of information may also be provided in conjunction with an app executing on the consumer's mobile device. For example, if the mobile device includes a social networking feature, the consumer may enable the app to provide updates to the consumer's social network to notify friends of a particularly interesting promotion. It should be appreciated that the use of mobile technology and associated app frameworks may provide for particularly unique and beneficial uses of the promotion and marketing service through leveraging the functionality offered by the various mobile operating systems.

Additionally or alternatively, the consumer device 108 may interact through the promotion and marketing service 102 via a web browser. As yet another example, the consumer device 108 may include various hardware or firmware designed to interface with the promotion and marketing service 102 (e.g., where the consumer device 108 is a purpose-built device offered for the primary purpose of communicating with the promotion and marketing service 102, such as a store kiosk).

The merchant devices 110A-110N may be any computing device as known in the art and operated by a merchant. For example, the merchant devices 110A-110N may include a merchant point-of-sale, a merchant e-commerce server, a merchant inventory system, or a computing device accessing a web site designed to provide merchant access (e.g., by accessing a web page via a browser using a set of merchant account credentials). Electronic data received by the promotion and marketing service 102 from the merchant devices 110A-110N may also be provided in various forms and via various methods. For example, the merchant devices 110A-110N may provide real-time transaction and/or inventory information as purchases are made from the merchant. In other embodiments, the merchant devices 110A-110N may be employed to provide information to the promotion and marketing service 102 to enable the promotion and marketing service 102 to generate promotions or other marketing information to be provided to consumers.

In some embodiments, the merchant devices 110A-110N may facilitate a merchant portal in conjunction with the promotion and marketing service 102, such as using server 104 and database 106. In some embodiments, the merchant portal may provide for a real-time, or near real-time, connection between a merchant and the promotion and marketing service.

An example of a data flow for exchanging electronic information among one or more consumer devices, merchant devices, and the promotion and marketing service is described below with respect to FIG. 3.

Example Apparatuses for Implementing
Embodiments of the Present Invention

The server 104 may be embodied by one or more computing systems, such as apparatus 200 shown in FIG. 2A. As illustrated in FIG. 2A, the apparatus 200 may include a processor 202, a memory 204, input/output circuitry 206, communications circuitry 208, request processing circuitry 210, promotion generation circuitry 212, promotion acquisition circuitry 214, and negotiation circuitry 216. The apparatus 200 may be configured to execute the operations described above with respect to FIG. 1 and below with respect to FIGS. 3-8. Although these components 202-216 are described with respect to functional limitations, it should be understood that the particular implementations necessarily include the use of particular hardware. It should also be understood that certain of these components 202-216 may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the apparatus 200 may provide or supplement the functionality of particular circuitry. For example, the processor 202 may provide processing functionality, the memory 204 may provide storage functionality, the communications circuitry 208 may provide network interface functionality, and the like.

In some embodiments, the processor 202 (and/or co-processor or any other processing circuitry assisting or otherwise associated with the processor) may be in communication with the memory 204 via a bus for passing information among components of the apparatus. The memory 204 may be non-transitory and may include, for example, one or more volatile and/or non-volatile memories. In other words, for example, the memory may be an electronic storage device (e.g., a computer readable storage medium). The memory 204 may be configured to store information, data, content, applications, instructions, or the like, for enabling the apparatus to carry out various functions in accordance with example embodiments of the present invention.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 202 may be configured to execute instructions stored in the memory 204 or otherwise accessible to the processor. Alternatively or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present invention while configured accordingly. Alternatively, as another example, when the processor is embodied as an executor of software instructions, the instructions may specifically configure the processor to perform the algorithms and/or operations described herein when the instructions are executed.

In some embodiments, the apparatus 200 may include input/output circuitry 206 that may, in turn, be in communication with processor 202 to provide output to the user and, in some embodiments, to receive an indication of a user input. The input/output circuitry 206 may comprise a user interface and may include a display and may comprise a web user interface, a mobile application, a client device, a kiosk, or the like. In some embodiments, the input/output circuitry 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

Request processing circuitry 210 includes hardware configured to receive and process requests from a consumer related to the search, negotiation, or acquisition of promotions. The request processing circuitry 210 may utilize processing circuitry, such as the processor 202, to perform these actions. The request processing circuitry 210 may receive the data via a network interface provided by the communications circuitry 208. However, it should also be appreciated that, in some embodiments, the request processing circuitry 210 may include a separate processor, specially configured field programmable gate array (FPGA), or application specific interface circuit (ASIC) to perform processing of consumer promotion requests, determination of criteria needed to meet requests, facilitate communication of status or consumer requests, and the like. The request processing circuitry 210 is therefore implemented using hardware components of the apparatus configured by either hardware or software for implementing these planned functions.

Promotion generation circuitry 212 includes hardware configured to identify and determine promotions to be offered to consumers based on data received via a network interface. The promotion generation circuitry 212 may utilize processing circuitry, such as the processor 202, to perform these actions. The promotion generation circuitry 212 may receive the data via a network interface provided by the communications circuitry 208. However, it should also be appreciated that, in some embodiments, the promotion generation circuitry 212 may include a separate processor, specially configured field programmable gate array (FPGA), or application specific interface circuit (ASIC) to perform the determination and generation of promotions applicable to a consumer request and facilitate communication of such promotions to a consumer. The promotion generation circuitry 212 is therefore implemented using hardware components of the apparatus configured by either hardware or software for implementing these planned functions.

Promotion acquisition circuitry 214 includes hardware configured to facilitate the acquisition of promotions by a consumer. The promotion acquisition circuitry 214 may utilize processing circuitry, such as the processor 202, to perform these actions. The promotion acquisition circuitry 214 may receive data via a network interface provided by the communications circuitry 208. However, it should also be appreciated that, in some embodiments, the promotion acquisition circuitry 214 may include a separate processor, specially configured field programmable gate array (FPGA), or application specific interface circuit (ASIC) to perform the acceptance and purchase of promotions by a consumer and facilitate the notification of such to a consumer and/or a merchant. The promotion acquisition circuitry 214 is therefore implemented using hardware components of the apparatus configured by either hardware or software for implementing these planned functions.

Negotiation circuitry 216 includes hardware configured to facilitate negotiations between consumers and merchants with regard to promotions for transactions offered by the merchant. The negotiation circuitry 216 may utilize processing circuitry, such as the processor 202, to perform these actions. The negotiation circuitry 216 may receive data via a network interface provided by the communications circuitry 208. However, it should also be appreciated that, in some embodiments, the negotiation circuitry 216 may include a separate processor, specially configured field programmable gate array (FPGA), or application specific interface circuit (ASIC) to perform provide for real-time or near real-time communications regarding negotiations between a consumer and a merchant and facilitate the proceeding of data related to such negotiations. The negotiation circuitry 216 is therefore implemented using hardware components of the apparatus configured by either hardware or software for implementing these planned functions.

As will be appreciated, any such computer program instructions and/or other type of code may be loaded onto a computer, processor or other programmable apparatus's circuitry to produce a machine, such that the computer, processor other programmable circuitry that execute the code on the machine create the means for implementing various functions, including those described herein.

It is also noted that all or some of the information presented by the example displays discussed herein can be based on data that is received, generated and/or maintained by one or more components of apparatus 200. In some embodiments, one or more external systems (such as a remote cloud computing and/or data storage system) may also be leveraged to provide at least some of the functionality discussed herein.

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

The consumer device(s) 108 may be embodied by one or more computing systems, such as apparatus 220 shown in FIG. 2B. As illustrated in FIG. 2B, the apparatus 220 may include a processor 222, a memory 224, an input/output circuitry 226, a communications circuitry 228, request generation circuitry 230, promotions acquisition circuitry 232, and promotion negotiation circuitry 234. The apparatus 220 may be configured to execute the operations described below with respect to FIGS. 1 and 3-8. The functioning of the processor 222, the memory 224, the input/output circuitry 226, and the communication circuitry 228 may be similar to the similarly named components described above with respect to FIG. 2A. For the sake of brevity, additional description of these components is omitted.

Request generation circuitry 230 includes hardware configured to facilitate the generation of requests from a consumer related to the search, negotiation, or acquisition of promotions. The request generation circuitry 230 may utilize processing circuitry, such as the processor 202, to perform these actions. The request processing generation circuitry 230 may transmit and receive the data via a network interface provided by the communications circuitry 208. However, it should also be appreciated that, in some embodiments, the request generation circuitry 230 may include a separate processor, specially configured field programmable gate array (FPGA), or application specific interface circuit (ASIC) to facilitate the indication of criteria for consumer promotion requests, perform processing of consumer promotion requests, facilitate communication of status or consumer requests, and the like. The request generation circuitry 230 is therefore implemented using hardware components of the apparatus configured by either hardware or software for implementing these planned functions.

Promotion acquisition circuitry 214 includes hardware configured to facilitate the acquisition of promotions by a consumer. The promotion acquisition circuitry 214 may utilize processing circuitry, such as the processor 202, to perform these actions. The promotion acquisition circuitry 214 may receive data via a network interface provided by the communications circuitry 208. However, it should also be appreciated that, in some embodiments, the promotion acquisition circuitry 214 may include a separate processor, specially configured field programmable gate array (FPGA), or application specific interface circuit (ASIC) to perform the acceptance and purchase of promotions by a consumer and facilitate the notification of such to a consumer. The promotion acquisition circuitry 214 is therefore implemented using hardware components of the apparatus configured by either hardware or software for implementing these planned functions.

Promotion negotiation circuitry 234 includes hardware configured to facilitate negotiations between consumers and merchants via a promotion and marketing service with regard to promotions for transactions offered by the merchant. The promotion negotiation circuitry 234 may utilize processing circuitry, such as the processor 202, to perform these actions. The promotion negotiation circuitry 234 may receive data via a network interface provided by the communications circuitry 208. However, it should also be appreciated that, in some embodiments, the promotion negotiation circuitry 234 may include a separate processor, specially configured field programmable gate array (FPGA), or application specific interface circuit (ASIC) to perform the facilitation of real-time or near real-time communications regarding negotiations between a consumer and a merchant and facilitate the processing of data related to such negotiations. The promotion negotiation 234 is therefore implemented using hardware components of the apparatus configured by either hardware or software for implementing these planned functions.

The merchant device(s) 110 may be embodied by one or more computing systems, such as apparatus 240 shown in FIG. 2C. As illustrated in FIG. 2C the apparatus 240 may include a processor 242, a memory 244, an input/output circuitry 246, a communications circuitry 248, constraints generation circuitry 250, promotion generation circuitry 252, and promotion negotiation circuitry 254. The apparatus 240 may be configured to execute the operations described below with respect to FIGS. 1, 3-6, and 8. The functioning of the processor 242, the memory 244, the input/output circuitry 246, and the communication circuitry 248 may be similar to the similarly named components described above with respect to FIG. 2A. For the sake of brevity, additional description of these components is omitted.

Constraints generation circuitry 250 includes hardware configured to facilitate the indication of a merchant's constraints regarding promotion negotiations to a promotion and marketing service. The constraints generation circuitry 250 may utilize processing circuitry, such as the processor 202, to perform these actions. The constraints generation circuitry 250 may transmit and receive data via a network interface provided by the communications circuitry 208. However, it should also be appreciated that, in some embodiments, the constraints generation circuitry 250 may include a separate processor, specially configured field programmable gate array (FPGA), or application specific interface circuit (ASIC) to perform the addition and modification of negotiation constraints by a merchant and facilitate the communication of such constraints to a promotion and marketing service. The constraint generation circuitry 250 is therefore implemented using hardware components of the apparatus configured by either hardware or software for implementing these planned functions.

Promotion generation circuitry 252 includes hardware configured to identify and determine promotion data relevant to consumer requests and to be offered to consumers based on data received via a network interface. The promotion generation circuitry 252 may utilize processing circuitry, such as the processor 202, to perform these actions. The promotion generation circuitry 252 may receive the data via a network interface provided by the communications circuitry 208. However, it should also be appreciated that, in some embodiments, the promotion generation circuitry 252 may include a separate processor, specially configured field programmable gate array (FPGA), or application specific interface circuit (ASIC) to perform the determination and generation of promotion data applicable to a consumer request and facilitate communication of such promotions to a promotion and marketing service. The promotion generation circuitry 252 is therefore implemented using hardware components of the apparatus configured by either hardware or software for implementing these planned functions.

Promotion negotiation circuitry 254 includes hardware configured to facilitate negotiations between consumers and merchants via a promotion and marketing service with regard to promotions for transactions offered by the merchant. The promotion negotiation circuitry 254 may utilize processing circuitry, such as the processor 202, to perform these actions. The promotion negotiation circuitry 254 may receive data via a network interface provided by the communications circuitry 208. However, it should also be appreciated that, in some embodiments, the promotion negotiation circuitry 254 may include a separate processor, specially configured field programmable gate array (FPGA), or application specific interface circuit (ASIC) to perform the facilitation of real-time or near real-time communications regarding negotiations between a consumer and a merchant and facilitate the processing of data related to such negotiations. The promotion negotiation 254 is therefore implemented using hardware components of the apparatus configured by either hardware or software for implementing these planned functions.

Example Electronic Marketing Information Service Data Flow

FIG. 3 depicts an example data flow 300 illustrating interactions between a server 302, one or more consumer devices 304, and one or more merchant devices 306. The server 302 may be implemented in the same or a similar fashion as the server 104 as described above with respect to FIG. 1, the one or more consumer devices 304 may be implemented in the same or a similar fashion as the consumer devices 108A-108N as described above with respect to FIG. 1, and the one or more merchant devices 306 may be implemented in the same or a similar fashion as the merchant devices 110A-110N as described above with respect to FIG. 1.

The data flow 300 illustrates how electronic information may be passed among various systems when employing a server 302 in accordance with embodiments of the present invention. The one or more consumer devices 304 and/or one or more merchant devices 306 may provide a variety of electronic marketing information to the server 302 for use in providing promotion and marketing services to the consumer. This electronic marketing information may include, but is not limited to, location data, clickstream data, transaction data, communication channel data, and/or discretionary data.

As a result of transactions performed between the one or more consumer devices 304 and the server 302, the server 302 may provide fulfillment data to the consumer devices. The fulfillment data may include information indicating whether the transaction was successful, the location and time the product will be provided to the consumer, instruments for redeeming promotions purchased by the consumer, or the like.

In addition to the e-commerce interactions with the one or more consumer devices 304 offered by the server 302, the server 302 may leverage information provided by the consumer devices to improve the relevancy of marketing communications to individual consumers or groups of consumers. In this manner, the server 302 may determine promotions, goods, and services that are more likely to be of interest to a particular consumer or group of consumers based on clickstream data, location data, and other information provided by and/or relating to particular consumers. For example, the server 302 may detect the location of a consumer based on location data provided by the consumer device, and offer promotions based on the proximity of the consumer to the merchant associated with those promotions.

Alternatively, the server 302 may note that the consumer has an interest in a particular hobby (e.g., skiing) based on electronic marketing information associated with the consumer (e.g., a browser cookie that indicates they frequently visit websites that provide snowfall forecasts for particular ski resorts), and offer promotions associated with that hobby (e.g., a promotion offering discounted ski equipment rentals or lift tickets). It should be appreciated that a variety of different types of electronic marketing information could be provided to the server 302 for the purpose of improving the relevancy of marketing communications. It should also be appreciated that this electronic marketing information may be received from a variety of electronic sources, including various consumer devices, merchant devices, and other sources both internal and external to a promotion and marketing service. For example, other data sources may include imported contact databases maintained by merchants, electronic survey questions answered by consumers, and/or various other forms of electronic data.

It should also be appreciated that the server 302 may also control other factors of the electronic marketing communications sent to the consumer other than the particular promotions included in the electronic marketing communication. For example, the server 302 may determine the form, structure, frequency, and type of the electronic marketing communication. As with the content of the electronic marketing communication, these factors may be programmatically determined according to various methods, factors, and processes based on electronic data received by the server 302 for the purpose of maximize the likelihood that the communication will be relevant to the recipient consumer.

The server 302 interactions with the one or more merchant devices 306 may be related to enabling the merchant to market their products using a promotion and marketing service. For example, the one or more merchant devices 306 may provide promotion data defining one or more promotions to be offered by the promotion and marketing service on behalf of the merchant. The server 302 may receive this information and generate information for providing such promotions via an e-commerce interface, making the promotions available for purchase by consumers. The server 302 may also receive information about products from the one or more merchant devices 306. For example, a merchant may provide electronic marketing information indicating particular products, product prices, inventory levels, and the like to be marketed via a promotion and marketing service. The server 302 may receive this information and generate listing information to offer the indicating products to consumers via a promotion and marketing service.

The one or more merchant devices 306 may also receive information from the server 302. For example, in some embodiments a merchant may obtain access to certain business analytic data aggregated, generated, or maintained by the server 302. As a particular example, a merchant might offer to pay for consumer demographic data related to products or services offered by the merchant. It should be appreciated however, that a merchant may not need to list any products or services via the promotion and marketing service in order to obtain such data. For example, the promotion and marketing service may enable merchants to access electronic marketing data offered via the promotion and marketing service based on a subscription model. The one or more merchant devices 306 may also receive electronic compensation data from the server 302. For example, when a promotion or product is sold by the promotion and marketing service on behalf of the merchant, a portion of the received funds may be transmitted to the merchant. The compensation data may include information sufficient to notify the merchant that such funds are being or have been transmitted. In some embodiments, the compensation data may take the form of an electronic wire transfer directly to a merchant account. In some other embodiments, the compensation data may indicate that a promotion or product has been purchased, but the actual transfer of funds may occur at a later time. For example, in some embodiments, compensation data indicating the sale of a promotion may be provided immediately, but funds may not be transferred to the merchant until the promotion is redeemed by the consumer.

Embodiments advantageously provide for improvements to the server and/or merchant devices and/or consumer devices by facilitating real-time or near real-time negotiations between consumers and merchants for promotions related to transactions provided by the merchant.

Description of Example Embodiments

In some embodiments, a promotion and marketing service may facilitate a real-time marketplace whereby consumers and merchants may participate in a bidding system for the generation and acquisition of promotions. Such a real-time marketplace may provide for generating one or more promotions for a specific transaction that is specific to an individual consumer for an individual merchant and which may be provided for a limited time period and/or may be redeemable in a limited time period. For example, in some embodiments, a consumer who is in the vicinity of a specific merchant may instigate a negotiation with the merchant, through the promotion and marketing service, for a promotion redeemable in a short time period, such as by requesting a specific discount for a transaction if the consumer visits the merchant and competes the transaction within a short time, e.g. the next hour. In some embodiments, the merchant may be able to respond to a consumer's promotion request in a number of manners. For example, if the promotion terms (e.g. the specific discount and time period) requested by the consumer are acceptable to the merchant, the merchant may provide an indication to the consumer (through the promotion and marketing service) that the terms are acceptable. The promotion and marketing service may then facilitate the consumer accepting the promotion terms and facilitate the acquisition of the promotion by the consumer.

Alternatively, the merchant may instead provide a counter-offer proposing a promotion on alternate terms that are acceptable to the merchant. The real-time marketplace may facilitate multiple iterations of counter-offers between the consumer and merchant to allow the consumer and merchant to agree on promotion terms that are mutually acceptable. In some embodiments, after the consumer and merchant have agreed on the promotion terms, the promotion and marketing service may facilitate the acquisition of the promotion by the consumer. Additionally, in some embodiments, the promotion and marketing service may further facilitate the redemption of the promotion upon completion of a transaction between the consumer and the merchant.

FIG. 4 illustrates a flowchart of exemplary operations for a process 400 that may be executed by one or more apparatuses to facilitate the negotiation and generation of one or more promotions between a consumer and a merchant, in accordance with some example embodiments discussed herein. Operations of process 400 may begin at block 402 where a consumer may initiate a request for a promotion based on certain terms from a merchant. For example, in some embodiments, an apparatus, such as a consumer device 108, may provide means, such as Request Generation Circuitry 230 or the like, for a consumer to indicate a request for a promotion from a selected merchant that comprises specific terms, such as a particular discount for a transaction or the like. In some embodiments, the consumer may than provide the consumer request to the promotion and marketing service which facilitates a real-time marketplace between consumers and merchants.

At block 404, the promotion and marketing service may receive the consumer request from the consumer device and initiate processing of the request, for example using means such as Request Processing Circuitry 210, or the like, of server 104 of the promotion and marketing service. At block 406, the promotion and marketing service may compare the request with a merchant's negotiation constraints stored by the promotion and marketing service, such as in database 106, if there are any. For example, means such as the Request Processing Circuitry 210 or the like, may determine the merchant specified in the consumer request and determine if the merchant has stored negotiation constraints, and if so may then retrieve the merchant's stored negotiation constraints. The promotion and marketing service, using means such as the Request Processing Circuitry 210 or the like, may then compare the merchant's negotiation constraints with the consumer request to determine if the consumer request fits within the merchant's negotiation constraints.

In some embodiments, merchant negotiation constraints may include one or more of a maximum and/or minimum for allowable discount or transaction amount, location constraints for the consumer (e.g. the consumer is within a certain distance of the merchant), limits on the number of times a consumer can request a deal and/or submit a bid in a negotiation, a determination of whether the consumer is a current customer of the merchant, demographics of target consumers, time period for redemption of promotion, or the like. In some embodiments, the merchant may provide the constraints to the promotion and marketing service using means such as the Constraints Generation Circuitry 250 or the like, of a merchant device 110. In some embodiments, the merchant may be provided with the ability to modify the negotiation constraints on a real-time basis, such as to allow the merchant to change the constraints based on the merchant's current capacity for certain types of transactions.

At block 408, if the consumer request fits within the merchant's negotiation constraints, the promotion and marketing service, using means such as Promotion Generation Circuitry 212 or the like, may then generate an impression comprising the promotion for the consumer based on the promotion terms in the consumer request. The promotion and marketing service, using means such as Promotion Generation Circuitry 212 or the like, may also retrieve data, such as offering parameters, redemption parameters, or the like from database 106, for example, to use in the generation of the promotion. At block 418, the promotion and marketing service may then provide the impression to the consumer, for example by providing the impression to a consumer device 108 to be displayed on a display of the consumer device 108.

If the consumer request does not fit within the merchant's negotiation constraints, at block 410, the promotion and marketing service, using means such as Request Processing Circuitry 212, Negotiation Circuitry 216 or the like, may provide the consumer request to the merchant, such as by providing for transmission of the consumer request to a merchant device 110. In some embodiments, the promotion and marketing service may also provide consumer profile information or the like, which may be stored by the promotion and marketing service, along with the consumer request to facilitate decisions by the merchant. For example, the promotion and marketing service may provide data about the consumer such as of the consumer's past purchase history, consumer demographics, and/or the like.

The merchant, using means such as Promotion Negotiation Circuitry 254 or the like, may then analyze the consumer request and make a determination of whether the promotion terms are acceptable. If the promotion terms are acceptable to the merchant the merchant may provide an indication accepting the request to the promotion and marketing service. In some embodiments, the merchant may also provide additional terms for the promotion, using means such as Promotion Negotiation Circuitry 254 or the like.

If the promotion terms are not acceptable to the merchant, but the merchant would like to propose a counter-offer with different promotion terms, the merchant may generate the counter-offer using means such as Promotion Negotiation Circuitry 254 or the like. The merchant may then provide an indication of the promotion counter-offer to the promotion and marketing service.

If the promotion terms are not acceptable to the merchant, and the merchant does not want to propose a counter-offer, the merchant may provide an indication that consumer request is not acceptable to the promotion and marketing service, using means such as Promotion Negotiation Circuitry 254 or the like.

At block 412, the promotion and marketing service may receive an indication from the merchant regarding the consumer request and may determine the response to provide to the consumer, using means such as Request Processing Circuitry 210, Negotiation Circuitry 216, or the like.

If the merchant does not accept the consumer request, at block 414, the promotion and marketing service, using means such as Negotiation Circuitry 212 or the like, may then provide an indication to the consumer that no promotion is available from the merchant based on the requested promotion terms, for example by providing the indication to a consumer device 108 to be displayed on a display of the consumer device 108.

If the merchant accepted the consumer request, the promotion and marketing service, using means such as Promotion Generation Circuitry 212 or the like, may then generate an impression comprising the promotion for the consumer based on the promotion terms in the consumer request and, if any, the additional promotion terms provided by the merchant. The promotion and marketing service, using means such as Promotion Generation Circuitry 212 or the like, may also retrieve data, such as offering parameters, redemption parameters, or the like from database 106, for example, to use in the generation of the promotion. At block 418, the promotion and marketing service may then provide the impression to the consumer, for example by providing the impression to a consumer device 108 to be displayed on a display of the consumer device 108.

If the merchant provided a counter-offer to the consumer request, the promotion and marketing service, using means such as Negotiation Circuitry 212 or the like, may then generate an impression comprising the promotion counter-offer for the consumer based on the promotion terms in the merchant's counter-offer. At block 418, the promotion and marketing service may then provide the impression with the promotion counter-offer to the consumer, for example by providing the impression to a consumer device 108 to be displayed on a display of the consumer device 108.

In some embodiments, the promotion and marketing service may then receive a response from the consumer in regard to the impression. If the promotion and marketing service receives an acceptance of the promotion, or in the case of a promotion counter-offer, an acceptance of the promotion counter-offer, from the consumer, the promotion and marketing service, using means such as the Promotion Generation Circuitry 212, Promotion Acquisition Circuitry 214, or the like, may generate and complete the acquisition of the promotion for the consumer at block 422.

In some embodiments, in the case where the merchant provided a promotion counter-offer at block 412, the promotion and marketing service may allow the consumer to accept the promotion counter-offer or continue negotiation with the merchant. For example, if the consumer does not wish to accept the counter-offer, the promotion and marketing may facilitate the consumer providing a modified request to the merchant with different promotion terms.

In some embodiments, if at block 420, the consumer indicated that the promotion or the promotion counter-offer was not acceptable, at block 424, the promotion and marketing service determines whether the consumer provided a modified request with different promotion terms. If the consumer did not provide a modified request, the operation ends at block 426. If the consumer did provide a modified request, operation returns to block 406 and continues.

In some embodiments, a promotion and marketing service may facilitate a real-time marketplace whereby consumers may request availability of promotions using a specified criteria, for example for a category, such as restaurants, activities, shopping, etc., around the consumers location or in a defined area, and/or during a specified time period. Such a real-time marketplace may provide for searching for and generating one or more promotions for a specific transaction that is specific to an individual consumer for an individual merchant and which may be provided for a limited time period and/or may be redeemable in a limited time period. For example, in some embodiments, a consumer who is in a certain neighborhood may instigate a search for a promotion at a particular type of restaurant within a certain distance. In some embodiments, the promotion and marketing system may determine the appropriate merchants in the area and determine if the merchant has a current promotion or may solicit the merchants for a promotion for the consumer. The promotion and marketing service may then facilitate the consumer accepting the promotion terms and facilitate the acquisition of the promotion by the consumer. Additionally, in some embodiments, the promotion and marketing service may further facilitate the redemption of the promotion upon completion of a transaction between the consumer and the merchant.

FIG. 5 illustrates a flowchart of exemplary operations for a process 500 that may be executed by one or more apparatuses to facilitate the search for promotions and the generation of one or more promotions for a consumer, in accordance with some example embodiments discussed herein. Operations of process 500 may begin at block 502 where a consumer may initiate a request for a promotion based on certain criteria, such as category, location, time, etc. For example, in some embodiments, an apparatus, such as a consumer device 108, may provide means, such as Request Generation Circuitry 230 or the like, for a consumer to indicate a request for a promotion that comprises specific criteria, such as a particular category, in a particular area, and/or during a particular time period, or the like. In some embodiments, the consumer may than provide the consumer request to the promotion and marketing service which facilitates a real-time marketplace between consumers and merchants.

At block 504, the promotion and marketing service may receive the consumer request from the consumer device and initiate processing of the request, for example using means such as Request Processing Circuitry 210, or the like, of server 104 of the promotion and marketing service. In some embodiments, the promotion and marketing service, using means such as Request Processing Circuitry 210, Promotion Generation Circuitry 212, or the like, may determine promotion terms that may appeal to the consumer that should be included in the request to the merchant, such as based on consumer profile information which may be stored by the promotion and marketing service.

At block 506, the promotion and marketing service may determine which merchants fit the criteria of the consumer's request, using means such as the Request Processing Circuitry 210 or the like. The promotion and marketing service, using means such as the Request Processing Circuitry 210 or the like, may then generate a listing of merchants that may fit the criteria of the consumer's request. In some embodiments, the listing of merchants may also be determined in part based on consumer profile information or the like which may be stored by the promotion and marketing service.

At block 508, the promotion and marketing service, using means such as Request Processing Circuitry 210 or the like, may then select a first merchant from the listing of merchants.

At block 510, the promotion and marketing service may compare the request with the merchant's negotiation constraints stored by the promotion and marketing service, such as in database 106, if there are any. For example, means such as the Request Processing Circuitry 210 or the like, may determine if the merchant has stored negotiation constraints, and if so may then retrieve the merchant's stored negotiation constraints. The promotion and marketing service, using means such as the Request Processing Circuitry 210 or the like, may then compare the merchant's negotiation constraints with the consumer request to determine if the consumer request fits within the merchant's negotiation constraints.

In some embodiments, merchant negotiation constraints may include one or more of a maximum and/or minimum for allowable discount or transaction amount, location constraints for the consumer (e.g. the consumer is within a certain distance of the merchant), limits on the number of times a consumer can request a deal and/or submit a bid in a negotiation, a determination of whether the consumer is a current customer of the merchant, demographics of target consumers, time period for redemption of promotion, or the like. In some embodiments, the merchant may provide the constraints to the promotion and marketing service using means such as the Constraints Generation Circuitry 250 or the like, of a merchant device 110. In some embodiments, the merchant may be provided with the ability to modify the negotiation constraints on a real-time basis, such as to allow the merchant to change the constraints based on the merchant's current capacity for certain types of transactions.

If the merchant does not have stored negotiation constraints, operation proceeds to block 514, and the promotion and marketing service, using means such as Request Processing Circuitry 210 or the like, determines if there are additional merchants on the listing of merchants.

If the consumer request fits within the merchant's negotiation constraints, the promotion and marketing service, using means such as Request Processing Circuitry 210, Promotion Generation Circuitry 212, or the like, may then generate promotion data for that merchant and add it to a listing of response data for the consumer's request. The promotion and marketing service then removes that merchant from the listing of merchants.

At block 514, the promotion and marketing service, using means such as Request Processing Circuitry 210 or the like, determines if there are additional merchants on the listing of merchants. If there are additional merchants, the promotion and marketing service selects the next merchant and returns to block 510 and operation proceeds. If, at block 514, the promotion and marketing service, using means such as Request Processing Circuitry 210 or the like, determines that there are no additional merchants on the listing of merchants, operation continues to block 518.

At block 518, the promotion and marketing service, using means such as Request Processing Circuitry 210, Negotiation Circuitry 216 or the like, may provide the consumer request to any merchants remaining on the listing of merchants, such as by providing for transmission of the consumer request to a merchant device 110. In some embodiments, the promotion and marketing service may also provide consumer profile information or the like, which may be stored by the promotion and marketing service, along with the consumer request to facilitate decisions by the merchant. For example, the promotion and marketing service may provide data about the consumer such as of the consumer's past purchase history, consumer demographics, and/or the like.

The one or more merchant receiving the consumer request, using means such as Promotion Negotiation Circuitry 254 or the like, may then analyze the consumer request and make a determination of whether a promotion can be generated for the consumer. If a merchant determines that a promotion can be generated for the consumer, the merchant provides an indication accepting the request and providing the promotion terms to the promotion and marketing service, using means such as Promotion Negotiation Circuitry 254 or the like.

At block 520, the promotion and marketing service may receive promotion terms from one or more of the merchants that were sent the consumer request. At block, 522, the promotion and marketing service, using means such as Request Processing Circuitry 210, Negotiation Circuitry 216, Promotion Generation Circuitry 212, or the like, may then generate promotion data for each merchant supplied promotion terms and add it to a listing of response data for the consumer's request.

The promotion and marketing service, using means such as Promotion Generation Circuitry 212, Request Processing Circuitry 210, or the like, may then generate an impression comprising the promotion data for the selected merchants. The promotion and marketing service, using means such as Promotion Generation Circuitry 212 or the like, may also retrieve data, such as offering parameters, redemption parameters, or the like from database 106, for example, to use in the generation of the impression. At block 524, the promotion and marketing service may then provide the impression to the consumer, for example by providing the impression to a consumer device 108 to be displayed on a display of the consumer device 108.

In some embodiments, the promotion and marketing service may then receive a response from the consumer in regard to the impression. If the promotion and marketing service receives an acceptance of one of the promotions in the impression from the consumer at block 526, the promotion and marketing service, using means such as the Promotion Generation Circuitry 212, Promotion Acquisition Circuitry 214, or the like, may generate and complete the acquisition of the promotion for the consumer at block 528.

In some embodiments, a promotion and marketing service may facilitate a real-time marketplace whereby merchants may provide promotion data for us in generating impressions for consumers who are currently in the vicinity of the merchant. Such a real-time marketplace may provide a manner by which a merchant can offer promotions to nearby consumers which may be provided for a limited time period and/or may be redeemable in a limited time period, such as to allow a merchant to offer promotions to fill unmet capacity for certain transactions or to drive traffic from nearby consumers. For example, in some embodiments, a consumer may be provided with short term promotions for merchants that are located within a certain distance of the consumer's current location. In some embodiments, the promotion and marketing system may determine the consumers current location and determine appropriate merchants in the area that have current promotions that may appeal to the consumer. The promotion and marketing service may then facilitate the consumer accepting a promotion and facilitate the acquisition of the promotion by the consumer. Additionally, in some embodiments, the promotion and marketing service may further facilitate the redemption of the promotion upon completion of a transaction between the consumer and the merchant.

FIG. 6 illustrates a flowchart of exemplary operations for a process 600 that may be executed by one or more apparatuses to facilitate the offering of current and/or short term promotions to a consumer based on the consumer's current location, in accordance with some example embodiments discussed herein. Operations of process 600 may begin at block 602 where a promotion and marketing service may receive location data from a consumer, such as from a consumer device 108.

At block 604, the promotion and marketing service may determine which merchants are with the consumer's vicinity based on the consumer location data, using means such as the Promotion Generation Circuitry 212 or the like. The promotion and marketing service, using means such as the Promotion Generation Circuitry 212 or the like, may then generate a listing of merchants that are with the consumer's vicinity. In some embodiments, the listing of merchants may also be determined in part based on consumer profile information or the like which may be stored by the promotion and marketing service.

At block 606, the promotion and marketing service, using means such as Promotion Generation Circuitry 212 or the like, may then select a first merchant from the listing of merchants.

At block 608, the promotion and marketing service may determine if the merchant has a current promotion that may appeal to the consumer. For example, means such as the Promotion Generation Circuitry 212 or the like, may determine if the merchant has any current promotions data that may appeal to the consumer, such as may be stored in database 106, and if so, may then retrieve the merchant's stored current promotions data. The promotion and marketing service, using means such as the Request Promotion Generation Circuitry 212 or the like, may then store the merchant's current promotions data for creation of an impression for the consumer.

At block 612, the promotion and marketing service, using means such as Promotion Generation Circuitry 212 or the like, determines if there are additional merchants on the listing of merchants. If there are additional merchants, the promotion and marketing service selects the next merchant at block 614, returns to block 608 and operation proceeds. If, at block 612, the promotion and marketing service determines that there are no additional merchants on the listing of merchants, operation continues to block 616.

At block 616, the promotion and marketing service, using means such as Promotion Generation Circuitry 212 or the like, may then generate an impression comprising the promotion data for the selected merchants. The promotion and marketing service, using means such as Promotion Generation Circuitry 212 or the like, may also retrieve data, such as offering parameters, redemption parameters, or the like from database 106, for example, to use in the generation of the impression. At block 618, the promotion and marketing service may then provide the impression to the consumer, for example by providing the impression to a consumer device 108 to be displayed on a display of the consumer device 108.

In some embodiments, the promotion and marketing service may then receive a response from the consumer in regard to the impression. If the promotion and marketing service receives an acceptance of one of the promotions in the impression from the consumer at block 620, the promotion and marketing service, using means such as the Promotion Generation Circuitry 212, Promotion Acquisition Circuitry 214, or the like, may generate and complete the acquisition of the promotion for the consumer at block 622. If, at block 620, the promotion and marketing service does not receive a response from the consumer in regard to the impression, operation ends at block 624.

In some embodiments, a promotion and marketing service may facilitate a consumers indicating that certain types of promotions should be acquired for the consumer without the need for the consumer to take any action in regard to the specific promotion. In some embodiments, for example, a consumer may indicate to the promotion and marketing system, such as in a consumer profile or the like, that if a new promotion is available for a particular merchant or type of transaction within certain constraints, the promotion and marketing service should automatically acquire that promotion for the consumer without further instruction from the consumer. For example, a consumer may be a frequent customer of a certain restaurant and may provide standing instructions, in the consumer's profile for instance, that if a promotion for that restaurant becomes available, or if promotion for that restaurant within a certain value range becomes available, the promotion and marketing service should complete the acquisition of that promotion for the consumer.

FIG. 7 illustrates a flowchart of exemplary operations for a process 700 that may be executed by one or more apparatuses to facilitate the automatic purchase of promotions for a consumer that meet pre-established criteria, in accordance with some example embodiments discussed herein. Operations of process 700 may begin at block 702 where a promotion and marketing service may receive criteria for the purchase of new promotions from a consumer, such as from a consumer device 108. A consumer device may provide for indication of such criteria using means such as Request Generation Circuitry 230 or the like.

At block 704, the promotion and marketing service, using means such as the Request Processing Circuitry 210, Promotion Generation Circuitry 212, or the like may determine whether any new promotions match the purchase criteria specified by the consumer, such as in a consumer profile or the like. If there are no new promotions matching the consumer's purchase criteria, operation loops back to block 704 and continues.

If, at block 704, the promotion and marketing service determines that one or more new promotions match the purchase criteria specified by the consumer, the promotion and marketing service may complete the acquisition of the promotion for the consumer at block 708, using means such as the Promotion Acquisition Circuitry 214, Promotion Generation Circuitry 212, or the like. At block 708, the promotion and marketing service may then provide a notification to the consumer regarding the acquisition of the promotion.

In some embodiments, a promotion and marketing service may facilitate a real-time marketplace whereby consumers may search for last-minute promotions. For example, in some embodiments, a consumer who is in the vicinity of a specific event or activity, or who may desire to go to an event that is beginning in a short time frame (e.g. a sporting event, concert, etc.) may provide a request to the promotion and marketing service to search for available promotions for the activity or event. In some embodiments, the consumer may also be able to indicate a premium over the listed price that the consumer would be willing to pay to attend the activity or event.

FIG. 8 illustrates a flowchart of exemplary operations for a process 800 that may be executed by one or more apparatuses to facilitate the search for promotions for a specific activity by a consumer, in accordance with some example embodiments discussed herein. Operations of process 800 may begin at block 802 where the promotion and marketing service may receive a consumer request for last-minute promotions from a consumer device and initiate processing of the request, for example using means such as Request Processing Circuitry 210 or the like. For example, a consumer may initiate a request for last-minute promotions meeting certain criteria, such as for a particular activity or type of activity occurring in a short time frame. For example, in some embodiments, an apparatus, such as a consumer device 108, may provide means, such as Request Generation Circuitry 230 or the like, for a consumer to indicate a request for last-minute promotions.

At block 804, the promotion and marketing service, using means such as Request Processing Circuitry 210 or the like, may determine if there are one or more merchants that might be able to meet the consumer's request. If the promotion and marketing service determines that the consumer's request cannot be met, the promotion and marketing service may provide an indication to the consumer that no promotion is available for the activity or event at block 806, for example by providing the indication to a consumer device 108 to be displayed on a display of the consumer device 108.

At block 808, the promotion and marketing service, using means such as Request Processing Circuitry 212, Negotiation Circuitry 216 or the like, may provide the consumer request to the identified merchants, such as by providing for transmission of the consumer request to a merchant device 110. In some embodiments, the promotion and marketing service may also provide consumer profile information or the like, which may be stored by the promotion and marketing service, along with the consumer request to facilitate decisions by the merchant. For example, the promotion and marketing service may provide data about the consumer such as of the consumer's past purchase history, consumer demographics, and/or the like.

The merchant, using means such as Promotion Negotiation Circuitry 254 or the like, may then analyze the consumer request and make a determination of whether a promotion can be provided to the consumer. If the merchant can provide a promotion to the consumer, the merchant may provide an indication accepting the request and providing promotion data to the promotion and marketing service.

At block 810, the promotion and marketing service may receive an indication from the merchant regarding the consumer request and may determine the response to provide to the consumer, using means such as Request Processing Circuitry 210, Negotiation Circuitry 216, or the like.

If the one or more merchants cannot fulfill the consumer's request, the promotion and marketing service may provide an indication to the consumer that no promotion is available for the activity or event at block 806.

At block 812, if the merchant accepted the consumer request, the promotion and marketing service, using means such as Promotion Generation Circuitry 212 or the like, may then generate an impression comprising the promotion for the consumer based on the promotion data provided by the merchant. The promotion and marketing service, using means such as Promotion Generation Circuitry 212 or the like, may also retrieve data, such as offering parameters, redemption parameters, or the like from database 106, for example, to use in the generation of the promotion. At block 814, the promotion and marketing service may then provide the impression to the consumer, for example by providing the impression to a consumer device 108 to be displayed on a display of the consumer device 108.

In some embodiments, the promotion and marketing service may then receive a response from the consumer in regard to the impression at block 816. If the promotion and marketing service receives an acceptance of the promotion from the consumer, the promotion and marketing service, using means such as the Promotion Generation Circuitry 212, Promotion Acquisition Circuitry 214, or the like, may generate and complete the acquisition of the promotion for the consumer at block 422.

If the consumer did not accept the promotion offered in the impression, the operation ends at block 820.

FIG. 9 illustrates a flowchart of exemplary operations for a process 900 that may be executed by one or more apparatuses, such as consumer device 108, to facilitate the negotiation and generation of one or more promotions between a consumer and a merchant, in accordance with some example embodiments discussed herein. Operations of process 900 may begin at block 902 where a consumer may initiate a request for a promotion based on certain terms from a merchant, such as by entering a request in a user interface provided by consumer device 108. For example, in some embodiments, an apparatus, such as a consumer device 108, may provide means, such as input/output circuitry 226, processor 222, and Request Generation Circuitry 230 or the like, for a consumer to indicate a request for a promotion from one or more merchants that comprises specific terms, such as a particular discount for a transaction or the like.

At block 904, the consumer device may cause the consumer request for a promotion to be transmitted to the promotion and marketing service to initiate processing of the request, for example using means such as Request Generation Circuitry 230, communications circuitry 228, and processor 222, or the like, of consumer device 108.

At block 906, the consumer device may receive an impression from the promotion and marketing service comprising promotion data that matches the consumer request from one or more merchants, for example using means such as Promotion Negotiation Circuitry 234, Promotion Acquisition Circuitry 232, communications circuitry 228, processor 222, or the like, of consumer device 108.

At block 908, the consumer device may receive a selection from the consumer of one of the promotions provided in the impression that the consumer wishes to purchase, for example using means such as Promotion Acquisition Circuitry 232, communications circuitry 228, processor 222, or the like, of consumer device 108. If the consumer makes a selection of one of the promotions to purchase, the consumer device may cause the selection to be transmitted to the promotion and marketing service to facilitate the purchase/acquisition of the promotion, for example using means such as Promotion Acquisition Circuitry 232, communications circuitry 228, processor 222, or the like, of consumer device 108.

Alternatively or additionally, some embodiments may provide for the consumer to further negotiate for a promotion from one or more merchants by allowing for the consumer to modify the promotion request instead of accepting one of the promotions provided in the impression. As shown at block 912, the consumer device may receive modified request parameters from the consumer, such as indicating a different discount or the like, for example using means such as Promotion Negotiation Circuitry 234, input/output circuitry 226, processor 222, or the like, of consumer device 108.

If the consumer device receives modified request parameters from the consumer at block 912, operation returns to block 904 where the consumer device causes the modified request to be transmitted to the promotion and marketing service. If the consumer does not make a selection of a promotion from the impression and does not provide modified request parameters, operation would end at block 914.

FIG. 10 illustrates a flowchart of exemplary operations for a process 1000 that may be executed by one or more apparatuses, such as merchant device 110, to facilitate the negotiation and generation of one or more promotions between a consumer and a merchant, in accordance with some example embodiments discussed herein. Operations of process 1000 may begin at block 1002 where a merchant receives a consumer's request for a promotion based on certain terms, such as from a promotion and marketing service. For example, in some embodiments, an apparatus, such as a merchant device 110, may provide means, such as communications circuitry 248, processor 242, and/or Promotion Negotiation Circuitry 254 or the like, for a merchant to receive a request for a promotion that comprises specific terms, such as a particular discount for a transaction or the like.

In some embodiments, at block 1004, the merchant device may also receive consumer profile data, such as from a promotion and marketing service, that is associated with the consumer who initiated the request for a promotion, for example using means such as communications circuitry 248, processor 242, and/or Promotion Negotiation Circuitry 254 or the like, of merchant device 110. In some embodiments, the received consumer profile data may be used by the merchant in the process of determining whether to offer a promotion to the consumer based on the terms specified in the request, whether to propose an alternate promotion, or to make no offer to the consumer.

At block 1006, the merchant device may receive an indication from the merchant regarding a response to the consumer request for a promotion, for example using means such as Promotion Negotiation Circuitry 254, input/output circuitry 246, processor 242, or the like, of merchant device 110. For example, the merchant may determine that the consumer request for a promotion is acceptable to the merchant, such as having terms that fall within the merchant's standard criteria, being a request from a particular type of consumer the merchant is trying to attract, is for a transaction that would fill the merchant's excess capacity, or the like, and the merchant may indicate such acceptance of the consumer request. The merchant may alternatively determine that the consumer request for a promotion is not acceptable. In some embodiments, the merchant may also provide a counter-offer to the consumer request for a promotion, rather than accepting or refusing the consumer request, for example using means such as Promotion Negotiation Circuitry 254, input/output circuitry 246, processor 242, or the like, of merchant device 110. For example, the merchant may determine that a promotion can be offered to the consumer using different terms, such as a different discount, a different redemption period, or the like.

At block 1008, the merchant device may determine whether or not the merchant provided an indication that the consumer request for a promotion was acceptable, for example using means such as Promotion Negotiation Circuitry 254, processor 242, or the like, of merchant device 110. If the merchant indicated that the consumer request was acceptable, promotion data for the merchant may be transmitted to the promotion and marketing service at block 1010, for example using means such as Promotion Generation Circuitry 252, communication circuitry 248, processor 242, or the like, of merchant device 110.

In some embodiments, if the merchant indicated that the consumer request was not acceptable, the merchant may further provide a counter-offer to the consumer request based on different terms at block 1012. If the merchant provides a counter-offer, the counter-offer promotion data for the merchant may be transmitted to the promotion and marketing service at block 1014, for example using means such as Promotion Negotiation Circuitry 254, communication circuitry 248, processor 242, or the like, of merchant device 110. If the merchant indicated that the consumer request was not acceptable, and does not provide a counter-offer, operations may end at block 1016.

In some embodiments, a merchant device, such as merchant device 100, may facilitate access to a merchant portal in conjunction with a promotion and marketing service, such as the promotion and marketing service 102. In some embodiments, such a merchant portal may provide for a real-time, or near real-time, connection between a merchant and the promotion and marketing service. The merchant portal may facilitate merchant interactions with the promotion and marketing service and consumers. For example, in some embodiments the merchant portal may facilitate the establishment and/or updating of merchant's negotiation criteria, such as a maximum and/or minimum allowable discount for a transaction, location criteria for a consumer initiating a request (e.g. consumers within X miles), limits on number of times a consumer may request or modify a request for a promotion, type of customers that can negotiate for promotions, or the like, for example.

In some embodiments, the merchant portal may facilitate the handling of consumer requests for a promotion. The merchant portal may also facilitate the providing of consumer data, such as consumer demographic data, purchase, history, or the like, from the promotion and marketing service to the merchant for use in the determination of a consumer request. In some embodiments, the merchant portal may also facilitate the offering of promotions to consumers who are within an area defined by the merchant, such as for a limited redemption period.

Blocks of the block diagrams and flowchart illustrations support combinations of means for performing the specified functions, combinations of steps for performing the specified functions and program instruction means for performing the specified functions. It will also be understood that each block of the circuit diagrams and process flowcharts, and combinations of blocks in the circuit diagrams and process flowcharts, can be implemented by special purpose hardware-based computer systems that perform the specified functions or steps, or combinations of special purpose hardware and computer instructions.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims.

That which is claimed:

1. A method for generating promotion impressions comprising:

receiving, via a processor and from a consumer device, a consumer request for a promotion, wherein the consumer request comprises one or more indications of consumer preferences for the promotion;

determining, via the processor, a potential merchant list comprising one or more potential merchants, based in part on the consumer request, the potential merchant list associated with a plurality of merchant devices, each of the plurality of merchant devices located remotely from other merchant devices of the plurality of merchant devices and located remotely from the consumer device;

for each potential merchant in the potential merchant list, determining, via the processor, whether the potential merchant is associated with pre-established promotion criteria that meets the consumer request;

for a first potential merchant set of the potential merchant list, the first potential merchant set comprising each potential merchant determined not to be associated with the pre-established promotion criteria that meets the consumer request:

generating, via the processor, transmission information comprising the consumer request for providing to a merchant device of the plurality of merchant devices, the merchant device associated with the potential merchant; and providing, via the processor in real-time to the merchant device associated with the potential merchant, the transmission information comprising the consumer request; and for a second potential merchant set, the second potential merchant set comprising at least one potential merchant determined not to be associated with the pre-established promotion criteria that meets the consumer request:

receiving, via the processor in real-time, a response from the merchant device associated with the potential merchant, the response comprising promotion data; and storing, via the processor, the promotion data associated with the potential merchant in a promotion data list; and determining, based on electronic marketing information corresponding to the consumer device and from the promotion data list associated with the second potential merchant set, a relevant promotion data subset associated with a consumer profile corresponding to the consumer device, the electronic marketing information comprising a first electronic marketing information portion generated by the processor in response to first user interaction with the processor via the consumer device associated with the consumer profile or an additional consumer device associated with the consumer profile, and the electronic marketing information comprising a second electronic marketing information portion received from at least one server external from the processor via the consumer device associated with the consumer profile or the additional consumer device associated with the consumer profile, and wherein the relevant promotion data subset comprises the promotion data stored in the promotion data list for at least one promotion determined as relevant to the consumer profile; and generating, via the processor in real-time, an impression comprising the relevant promotion data subset from the promotion data list.

2. The method of claim 1 further comprising:
providing the impression to a consumer in response to the consumer request;
receiving a selection from the consumer of a selected promotion within the impression; and
facilitating acquisition of the selected promotion for the consumer.

3. The method of claim 1 wherein the determining the potential merchant lists is further based in part on consumer profile data.

4. The method of claim 1 wherein the pre-established promotion criteria are provided by the merchant device associated with the potential merchant and may be modified by the merchant device associated with the potential merchant.

5. The method of claim 1 further comprising determining parameters for a promotion meeting the consumer request based at least in part on the consumer request and a consumer profile.

6. The method of claim 1 further comprising providing each merchant device associated with each potential merchant in the potential merchant list with consumer profile data along with the consumer request.

7. The method of claim 1 wherein the response received from the merchant device associated with the potential merchant is a counter-offer wherein the counter-offer comprises counter-offer promotion data different from the one or more indications of consumer preferences for the promotion.

8. The method of claim 7 further comprising:
providing the impression to a consumer in response to the consumer request;
receiving a modified request comprising one or more modified indications of consumer preferences for the promotion;
providing the modified request to the merchant device associated with the potential merchant;
receiving a response from the merchant device associated with the potential merchant with modified promotion data;
generating a new impression comprising the modified promotion data for the potential merchant; and
providing the new impression to the consumer.

9. The method of claim 1 wherein the consumer request is for a last-minute promotion and one of the one or more indications of consumer preferences for the promotion comprises an indication of a premium.

10. An apparatus comprising at least one processor and at least one memory including computer program instructions, the at least one memory and the computer program instructions configured to, with the at least one processor, cause the apparatus to at least:
receive, from a consumer device, a consumer request for a promotion, wherein the consumer request comprises one or more indications of consumer preferences for the promotion;
determine a potential merchant list comprising one or more potential merchants, based in part on the consumer request, the potential merchant list associated with a plurality of merchant devices, each of the plurality of merchant devices located remotely from other merchant devices of the plurality of merchant devices and located remotely from the consumer device;
for each potential merchant in the potential merchant list, determine whether the potential merchant is associated with pre-established promotion criteria that meets the consumer request;
for a first potential merchant set of the potential merchant list, the first potential merchant set comprising each potential merchant determined not to be associated with the pre-established promotion criteria that meets the consumer request:
generate transmission information comprising the consumer request to provide to a merchant device of the plurality of merchant devices, the merchant device associated with the potential merchant; and
provide, in real-time to the merchant device associated with the potential merchant, the transmission information comprising the consumer request; and
for a second potential merchant set, the second potential merchant set comprising at least one potential merchant from the first potential merchant set:
receive, in real-time, a response from the merchant device associated with the potential merchant, the response comprising promotion data; and
store the promotion data associated with the potential merchant in a promotion data list; and
determine, based on electronic marketing information corresponding to the consumer device and from the promotion data list associated with the second potential merchant set, a relevant promotion data subset associated with a consumer profile corresponding to the consumer device, the electronic marketing information comprising a first electronic marketing information portion generated by the processor in response to first user interaction with the processor via the consumer device associated with the consumer profile, and the electronic marketing information comprising a second electronic marketing information portion received from at least one server external from the processor via the consumer device associated with the consumer profile or the additional consumer device associated with the consumer profile, and wherein the relevant promotion data subset comprises the promotion data stored in the promotion data list for at least one promotion determined as relevant to the consumer profile; and
generate, in real-time, an impression comprising the relevant promotion data subset from the promotion data list.

11. The apparatus of claim 10 further comprising the at least one memory and the computer program instructions configured to, with the at least one processor, cause the apparatus to:
provide the impression to a consumer in response to the consumer request;
receive a selection from the consumer of a selected promotion within the impression; and
facilitate acquisition of the selected promotion for the consumer.

12. The apparatus of claim 10 wherein the determining the potential merchant list is further based in part on consumer profile data.

13. The apparatus of claim 10 wherein the pre-established promotion criteria are provided by the merchant device associated with the potential merchant and may be modified by the merchant device associated with the potential merchant.

14. The apparatus of claim 10 further comprising the at least one memory and the computer program instructions configured to, with the at least one processor, cause the apparatus to determine parameters for a promotion meeting the consumer request based at least in part on the consumer request and a consumer profile.

15. The apparatus of claim 10 further comprising the at least one memory and the computer program instructions configured to, with the at least one processor, cause the apparatus to provide each merchant device associated with each potential merchant in the potential merchant list with consumer profile data along with the consumer request.

16. The apparatus of claim 10 wherein the response received from the merchant device associated with the potential merchant is a counter-offer, wherein the counter-offer comprises counter-offer promotion data different from the one or more indications of consumer preferences for the promotion.

17. The apparatus of claim 16 further comprising the at least one memory and the computer program instructions configured to, with the at least one processor, cause the apparatus to:
provide the impression to a consumer in response to the consumer request;
receive a modified request comprising one or more modified indications of consumer preferences for the promotion;
provide the modified request to the merchant device associated with the potential merchant;
receive a response from the merchant device associated with the potential merchant with modified promotion data;
generate a new impression comprising the modified promotion data for the potential merchant; and
provide the new impression to the consumer.

18. The method of claim 1, wherein at least the first portion of electronic marketing information is collected from the consumer device based at least on privacy information granting access to one or more features of the consumer device utilized to generate the first portion of electronic marketing information.

* * * * *